United States Patent
Smith et al.

(10) Patent No.: US 11,037,076 B1
(45) Date of Patent: Jun. 15, 2021

(54) METHOD AND SYSTEM FOR DISTRIBUTING ELECTRONIC TICKET STATUS INFORMATION FOR A LIVE EVENT OVER A NETWORK TO A REMOTE SUBSCRIBER PORTABLE COMPUTING DEVICE

(71) Applicant: SOUTHERN EXPERIENCE, LLC, Atlanta, GA (US)

(72) Inventors: Kevin Smith, Atlanta, GA (US); Greg Foster, Atlanta, GA (US); Junior Gaspard, Atlanta, GA (US); Travis Bailey, Atlanta, GA (US); Rick Cabrera, Atlanta, GA (US); Chris Lecraw, Atlanta, GA (US)

(73) Assignee: SOUTHERN EXPERIENCE, LLC, Atlanta, GA (US)

( * ) Notice: Subject to any disclaimer, the term of this patent is extended or adjusted under 35 U.S.C. 154(b) by 182 days.

(21) Appl. No.: 16/122,672

(22) Filed: Sep. 5, 2018

Related U.S. Application Data

(60) Provisional application No. 62/554,925, filed on Sep. 6, 2017.

(51) Int. Cl.
*G06Q 10/02* (2012.01)
*H04W 4/021* (2018.01)

(52) U.S. Cl.
CPC ............ *G06Q 10/02* (2013.01); *H04W 4/021* (2013.01)

(58) Field of Classification Search
CPC ..................................................... G06Q 10/02
USPC ......................................................... 705/5
See application file for complete search history.

(56) References Cited

U.S. PATENT DOCUMENTS

| | | | | |
|---|---|---|---|---|
| 2010/0133339 A1* | 6/2010 | Gibson | .............. | G06Q 20/3276 235/382 |
| 2014/0129266 A1* | 5/2014 | Perl | ........................ | G06Q 30/02 705/5 |
| 2015/0052001 A1* | 2/2015 | Yuan | .................. | G06Q 30/0631 705/26.7 |

(Continued)

OTHER PUBLICATIONS

TicketNews.com, "AXS Invite simplifies ticket purchasing with friends" available at: https://www.ticketnews.com/2012/10/axs-invite-simplifies-ticket-purchasing-with-friends/, last accessed Nov. 19, 2020 (Year: 2012).*

*Primary Examiner* — Emmett K. Walsh
(74) *Attorney, Agent, or Firm* — Smith Tempel; Steven P. Wigmore

(57) ABSTRACT

A method and system for distributing electronic ticket status information over a network to a remote subscriber portable computing device for a live event includes providing an electronic ticket manager application to a subscriber for installation on the remote subscriber portable computing device. Ticket data for the live event is received over the Internet with a transmission server which has a microprocessor and a memory that stores a remote subscriber's preferences for ticket information format and destination address. The microprocessor filters the ticket data based on past live events and other subscribers who have attended past live events with the subscriber in a group seating arrangement. The microprocessor generates an alert that activates the portable computing device to display a message that suggests the subscriber may attend the live event and invite other subscribers to sit with the subscriber at the event.

8 Claims, 17 Drawing Sheets

(56) References Cited

U.S. PATENT DOCUMENTS

2016/0148122 A1* 5/2016 Paleja .................. G06F 3/04842
  705/5
2017/0351977 A1* 12/2017 Bijor ..................... H04W 4/021

* cited by examiner

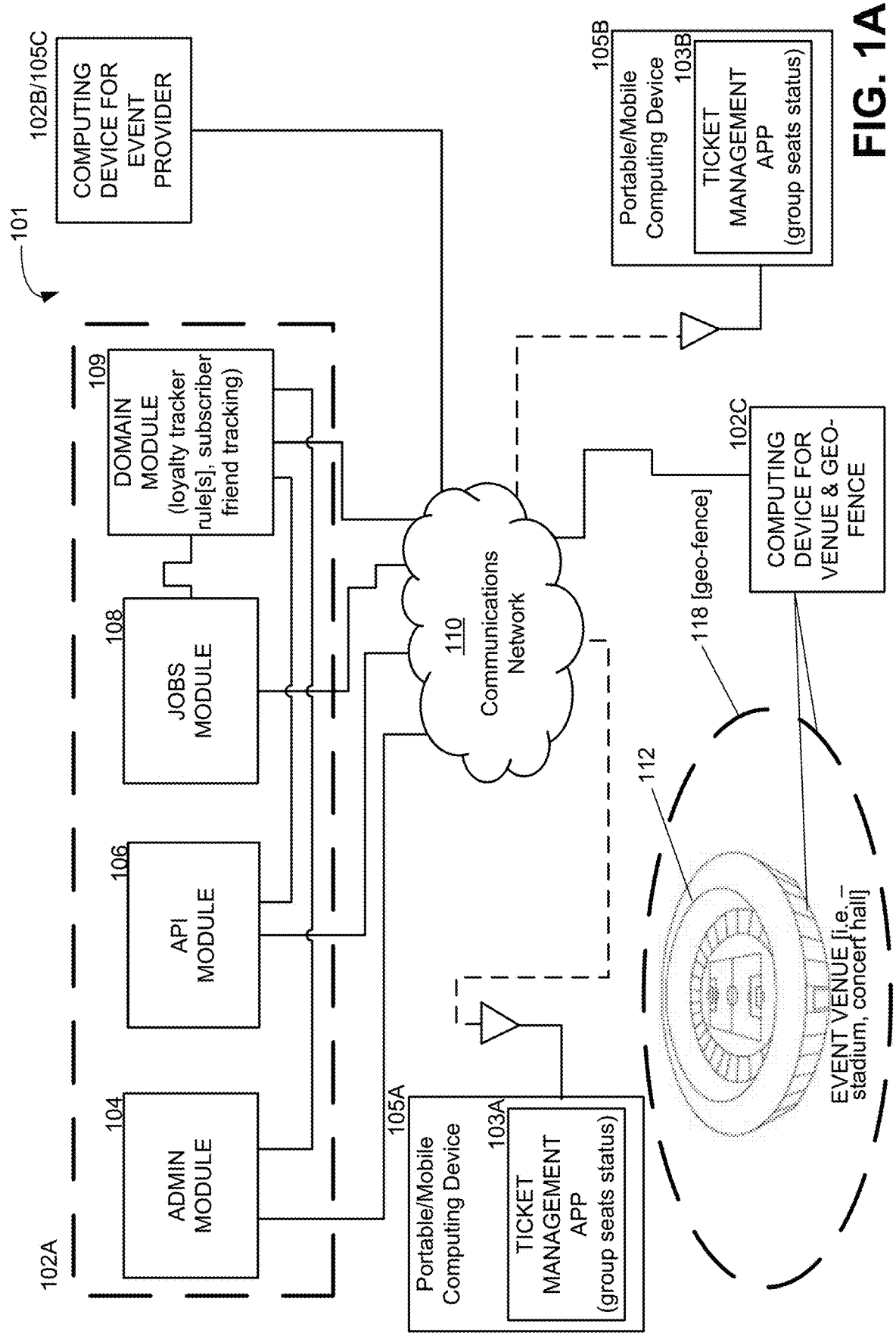

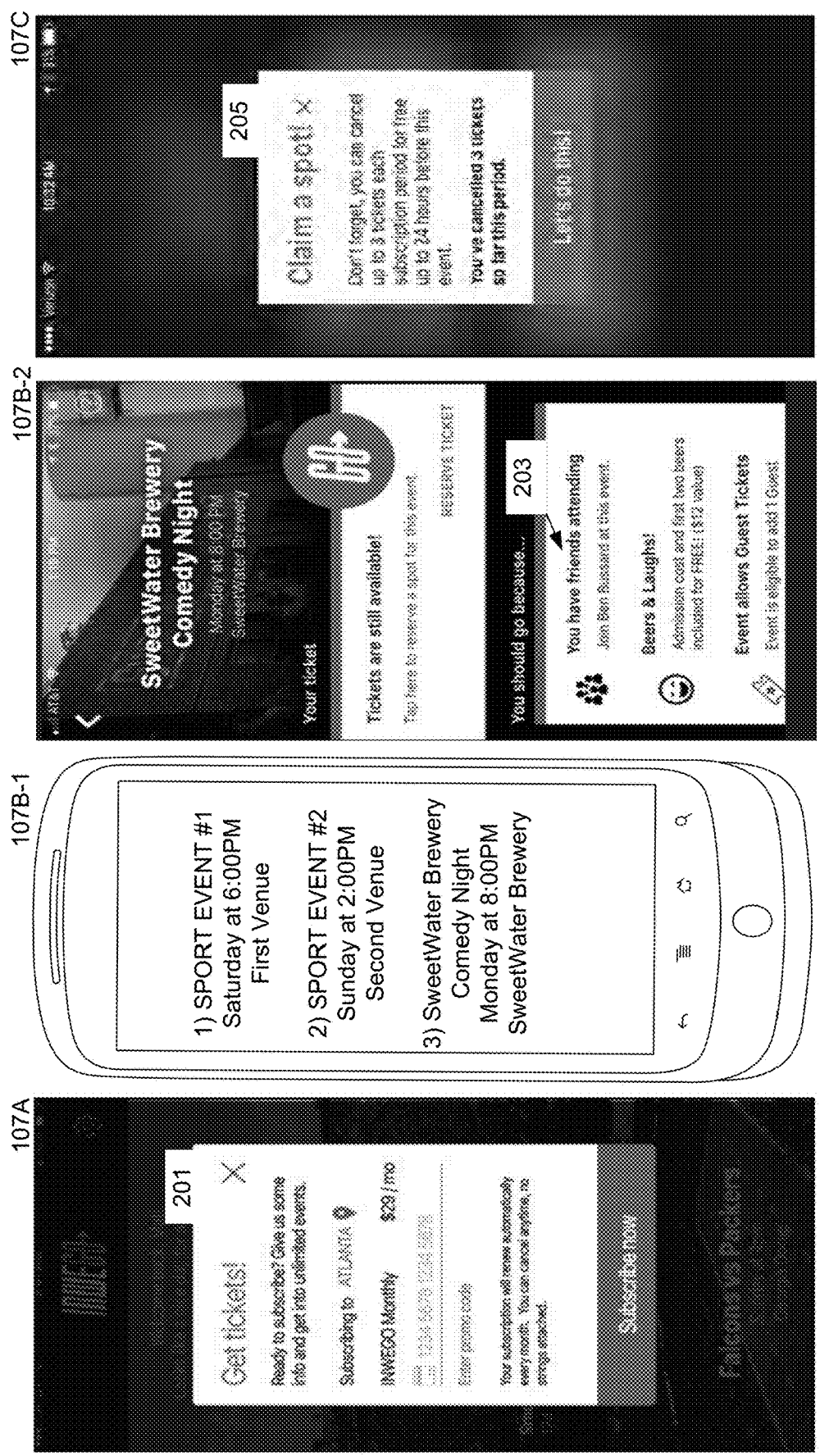

METHOD AND SYSTEM FOR DISTRIBUTING ELECTRONIC TICKET STATUS INFORMATION FOR A LIVE EVENT OVER A NETWORK TO A REMOTE SUBSCRIBER PORTABLE COMPUTING DEVICE

DESCRIPTION OF THE RELATED ART

The onset of the millennium has brought demands for more flexibility in managing tickets for seats at live events than ever before. For live event providers, this demand is a tall order. Historically, the live event ticket has not changed materially since TicketMaster was founded in 1976.

Paper tickets for live events in the past have had numerous drawbacks. Trying to make changes in seating with a paper based ticketing system is time consuming and very frustrating for the consumer. Paper based tickets do not allow live event fans any flexibility, especially during a live event.

For example, when a live event fan desires to sit with a group a friends, a single live event fan must often purchase the tickets for his or her friends all at the same time in order to secure a group of seats that are next to one another at the live event. If the live event fan wishes to add another friend to the group for group seating after the group ticket purchase is made, such a request usually cannot be accommodated since neighboring seats relative to the group purchase made earlier are likely to be sold to other fans.

Another problem in the art is that live events often do not sell out all seats to the event and many seats are left unused for most live events. Further, if a live event fan desires to go to attend several live events within a short period of time, such as within a single month, such a desire to attend live events every weekend within a one month period would often be cost prohibitive. An additional problem in the art is a single fan usually must reach out using a communication channel (i.e. texting, e-mails, phone calls, etc.) to his or her friends to determine if another friend will be attending a live event.

What is needed in the art is an electronic ticket management system which reduces costs for live events while increasing the flexibility of securing groups of tickets for group seating among friends at a live event. What is further needed in the art is a method and system that can help a live event fan to determine if one or more friends may be considering to attend a particular live event without the fan having to communicate to one or more friends over a communication channel independent of the electronic ticket management system. There is also a need in the art for a fan to be able to invite a friend to attend a live event when the fan is making a reservation for attending a live event.

SUMMARY OF THE DISCLOSURE

The method and system may comprise a subscription software service that allows members of the service/system to use portable computing devices, i.e. mobile phones, to gain access to a menu of live events within their city. Users of the subscription software running on a portable computing device (PCD), such as a smart phone, can reserve a spot at the event of their choice up to a predetermined amount of time, such as, but not limited to, about six days in advance. Members of the system/service may also cancel for free [no-fee] up to a certain number of electronic tickets, such as about three tickets, and up to another window of lead time, such as, but not limited to, about 24.0 hours before the event.

The method and system may also track subscribers who attend live events with other subscriber and who arrange group seating arrangements. Based on these past group seating arrangements from past live events, the method and system may offer suggestions of other subscribers of the system who may want to attend a live event with a first subscriber. One unique aspect of the method and system is that it may coordinate electronically the creating of group seating arrangements of subscribers who wish to sit together during a live event. Usually, a subscriber has no control over the location of any seat assignments for the live event when using the system and method. Further, seat locations (i.e. section, row, and seat numbers) are not generally provided until the subscriber arrives at the live event for electronic check-in. However, what the subscriber does have control over is the other subscribers who may sit with subscriber in the group seating arrangement at the live event.

From about two hours before the event and until the live event ends, each PCD usually must check-in electronically via a geo-fence using the PCD based software and within about a predetermined distance, such as about a 2.0 mile radius, relative to the venue to receive their digital ticket on their PCD. Members who cancel within another window of time, such as about 24.0 hours of the event, or members who fail to check-in using the app on the PCD may be subject to/penalized with additional fees.

The system and method allows members of the software service via a software application (an "app") running on their PCD to link their electronic tickets/passes with other members in order to be seated together as a group. Guest electronic tickets/passes to allow non-subscribers to attend the live event and be part of the group seating arrangement may also be purchased for an additional fee at some events.

According to one exemplary embodiment of the system, a rewards program may be provided exclusively for the members of the system, which is a software based subscription service as described above that utilizes an app running on a PCD as explained above. Members of the system using the app may be rewarded for renewing their software subscription each month, and incentivized to remain members with additional points as tenure/length of time for their membership increases. Points can be redeemed to reserve a spot at an event within a predetermined period of time, such as, but not limited to, more than about five days in advance ("early access"—for members).

The system's technology answers the demand for seat tickets at live events in a more flexible way relative to prior systems. The system and method described enables live event providers to secure additional attendees, while also giving members the discretion to make plans up until literally, the last minute prior to a live event.

A method and system for distributing electronic ticket status information over a network to a remote subscriber portable computing device for a live event within a venue may include providing an electronic ticket manager application to a subscriber for installation on the remote subscriber portable computing device. Ticket data for the live event may be received over the Internet with a transmission server. The transmission server may comprise a microprocessor and a memory that stores the remote subscriber's preferences for ticket information format and destination address.

The microprocessor may filter the ticket data based on past live events and other subscribers who have attended past live events with the subscriber in a group seating arrangement. The microprocessor may receive a request over the internet for details about a live event and generate an electronic reservation alert from the filtered data indicating other subscribers who have attended past live events with the subscriber and providing details about the live event.

The microprocessor may format the electronic reservation alert for display on the portable computing device of the remote subscriber, transmit the formatted electronic reservation alert over a wireless communication channel to the portable computing device of the remote subscriber based upon the destination address.

The reservation alert activates the portable computing device to display a message that suggests the subscriber may attend the live event and invite other subscribers to sit with the subscriber at the event according to a group seating arrangement comprising two or more subscribers with remote portable computing devices running the electronic ticket manager application.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1A illustrates several components of a system for distributing electronic ticket status information for a live event over a network to remote subscriber portable computing devices;

FIG. 2A illustrates one exemplary embodiment of a screen display for a portable computing device running a ticket management application (TM-App) program when an operator first subscribes to the software service offered by the system;

FIG. 2B-1 illustrates one exemplary embodiment of a screen display for a portable computing device running a ticket management application program that displays a listing of live events available to a subscriber of the system;

FIG. 2B-2 illustrates one exemplary embodiment of a screen display for a portable computing device running a ticket management application program that displays event information as well as a subscriber friend status indicator;

FIG. 2C illustrates one exemplary embodiment of a screen display for a portable computing device running a ticket management application program that produces a message about the cancellation policy for reservations made with the system;

DETAILED DESCRIPTION

Figure 1B:
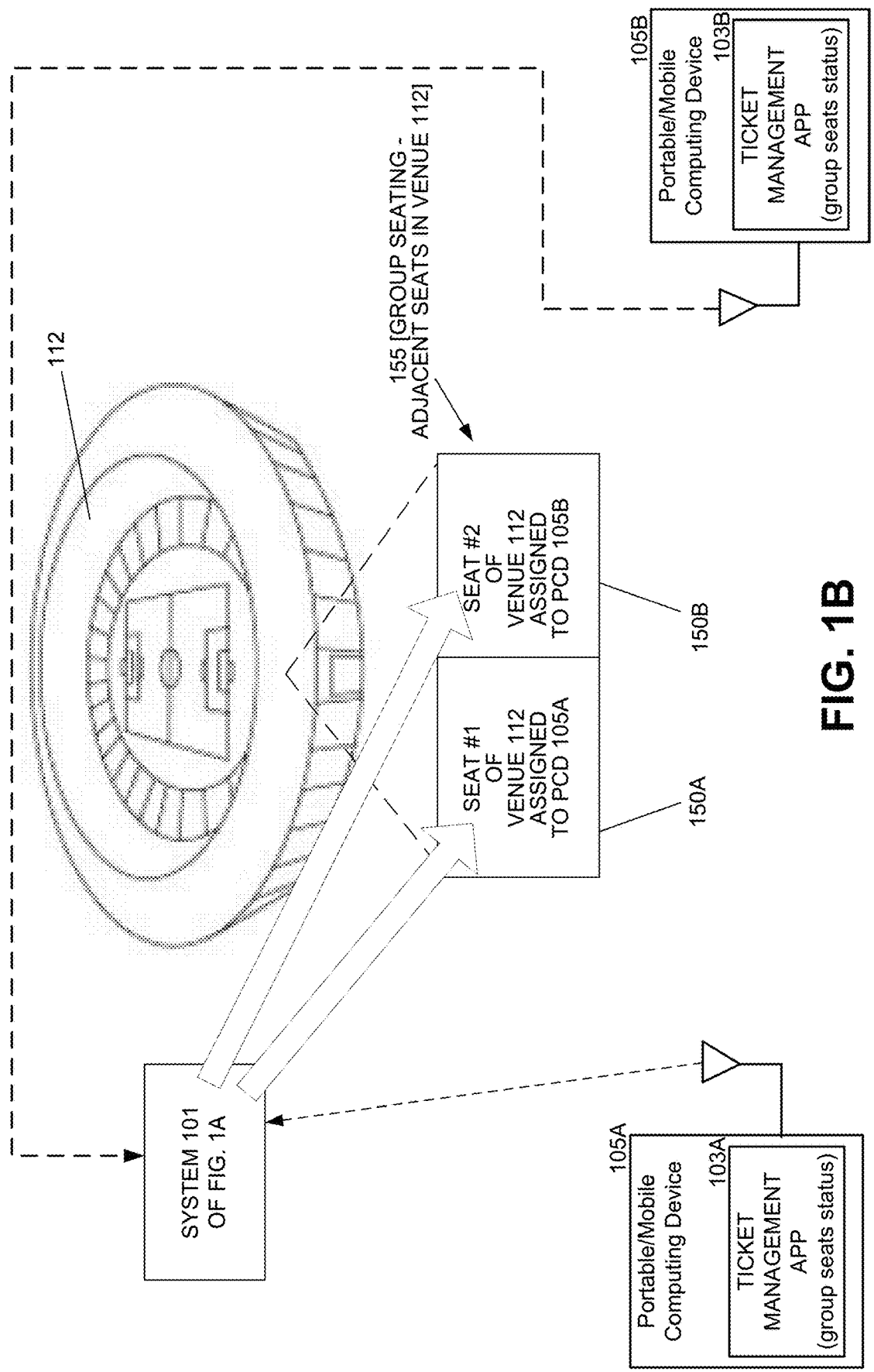
FIG. 1B illustrates how the system of FIG. 1A allows subscribers of the system to easily create group seating arrangements at live events with their portable computing devices.

The word "exemplary" is used herein to mean "serving as an example, instance, or illustration." Any aspect described herein as "exemplary" is not necessarily to be construed as exclusive, preferred or advantageous over other aspects.

Referring now to FIG. 1A, this figure illustrates several components of a system 101 for distributing electronic ticket status information for a live event over a network 110 to remote subscriber portable computing devices 105. The system may comprise a server 102A that is primarily responsible for managing the electronic ticket information. The server 102A may run/execute several different software modules such as, but not limited to, an administrative ("admin") module 104, an application programming interface ("API") module 106, and a jobs module 108. The server 102A may communicate with one or more portable computing devices ("PCDs") 105 which may run or execute a ticket management application ("TM-App") 103. The TM-App 103 may be responsible for managing electronic tickets for a subscriber of the services provided by the system.

One of the unique aspects of the system 101 is the TM-App 103 may be offered as a software as a service running on each PCD 105. The service may comprise allowing a subscriber operating his or her PCD 105 to display electronic tickets for allowing attendance to as many live events at different event venues 112 as desired by paying a service fee that is collected on a routine basis, such as, but not limited to, collecting service fees on a monthly basis. In other words, for a time-based flat fee, a subscriber with the TM-App 103 of the system 101 may attend live events as frequently as desired (i.e. weekly or even daily) by just paying the flat fee. Other flat fee arrangements for the electronic ticket subscription service via the TM-App 103 beyond monthly subscriptions are possible and are included within the scope of this disclosure, such as weekly, daily, and/or annual subscriptions, just to name a few.

As will be explained in more detail below, a fee-based penalty and/or other penalties may be assessed against a subscriber to reduce the number of no-shows/last minute cancellations for live events made by a subscriber. A fee based penalty may be assessed against as subscriber that is above the periodic fee (i.e. monthly fee) for the subscription service. For example, if a subscriber misses a live event after making a reservation with the TM-App 103, the TM-App 103 may charge a penalty on the order of one-half or one-third the price of admission for the missed live event. Other amounts for the fee based penalty are possible and are included within the scope of this disclosure.

The TM-App 103 provides each subscriber with ticketing information displayable on the PCD 105 so that a subscriber may attend a live event, such as, but not limited to, a music concert, a musical, a movie, a comedy show, a sporting event, a local festival, etc. Often, the TM-App 103 will not provide the seat assignment/exact location of a seat for a subscriber until the day of the live event and not until the subscriber is within a certain distance of the venue 112 as explained above in connection with the geo-fence 118 around the venue 112. The TM-App 103 also does not permit the subscriber to select his or her seat assignment/location. The seat assignment/location is assigned by the system 101 which takes into account any requested group seating arrangements among subscriber friends.

Another unique aspect of the system 101 is that the TM-App 103 allows each subscriber to easily arrange group seating among friends for live events who are also subscribers of the system 101. The system 101 via the TM-App 103 allows a subscriber easily identify other subscribers who may be attending a live event. The system via the TM-App 103 also allows a first subscriber to invite other second subscribers to attend a live event together such that the first and second subscribers may sit together in a group seating arrangement at the venue 112 for a live event. The system 101 via the TM-App 103 allows a first subscriber to also "link" or create a group seating arrangement if another second subscriber of the system 101 is already shown by the system 101 as attending a live event.

In other words, if a first subscriber learns that another second subscriber is already attending a live event via a status indicator presented in the TM-App 103, the first subscriber may create a "link" within the TM-App 103 to the second subscriber who is already attending. This link creates a group seating arrangement so that the first subscriber and second subscriber of the system 101, at a later time, may be assigned seats which are adjacent to one another once tickets are issued to the first and second subscribers via the TM-App 103. The system 101 is not limited to group seating arrangements for two subscribers. The system 101 may offer group seating arrangements for any number of subscribers of the system 101.

Another unique aspect of the system 101 is that for live events requiring tickets with seat assignments, such tickets which list the location of seats within the venue 112, are often not assigned to a subscriber until a predetermined time prior to the live event. Such a predetermined time prior to the live event may be a few hours to a day or two prior to the live event. According to one exemplary embodiment, a subscriber may not be provided with his or her seat location until the subscriber is "checked-in" at the venue 112. During the "check-in" process, a subscriber may learn of his/her seat location as well as the seat locations of other friend subscribers who may be adjacent to the subscriber in a group seating arrangement.

To become "checked-in" at the venue 112 for the live event, the TM-App 103 must sense "entry" into a geo-fence 118 that is positioned around the venue 112 by the system 101. The geo-fence 118 may be tracked by the TM-App 103 working with the GPS unit 705 [See FIG. 7] of the PCD 105. The geo-fence 118 and the "check-in" process are elements that the system 101 uses to track attendance to a live event at a venue 112 by a subscriber. If a subscriber operating the TM-App 103 who had made a reservation does not check-in within a venue 112 using a PCD 105, then the penalties described previously, such as a penalty fee for a no-show to a live event may be assessed against the subscriber who had made a prior reservation for attending the live event at venue 112.

In this description, the term "portable computing device" ("PCD") 105 is used to describe any device operating on a limited capacity power supply, such as a battery. Although battery operated PCDs 105 have been in use for decades, technological advances in rechargeable batteries coupled with the advent of third generation ("3G") and fourth generation ("4G") wireless technology have enabled numerous PCDs 105 with multiple capabilities. Therefore, a PCD 105 may be a cellular telephone, a satellite telephone, a pager, a PDA, a smartphone, a navigation device, a smartbook or reader, a media player, a tablet computer, a combination of the aforementioned devices, a laptop computer with a wireless connection, and/or wearable products, among others.

The Administration ("Admin") module 104 may receive the initial ticket data from computing device 102B/105C of an event provider/manager. This initial ticket data may simply comprise a number of seats that the event provider will make available to the subscribers of the system 101. At a later date, the ticket data received by the Admin module 104 from the computing device 102B/105C may include the seat locations for the seats, such as the row and aisle number for each seat. The Admin module 104 may be used to manually and/or automatically monitor the demand for the ticket inventory for a live event provider.

The Admin module 104 may automatically generate alerts when demand (i.e. a number of reservations) approaches a current maximum for the inventor (i.e. the number of seats) within a predetermined threshold. This predetermined threshold may comprise a number of seats, such as thirty, forty, and fifty seats. The Admin module 104 may also help generate seat assignments by assigning each subscriber a seat location in accordance with any group seating requests that were made with system 101.

The Application programming interface (API) module 106 may comprise the main service point running on the server 102A for the Android operating system ("OS") and Apple-based iOS applications running on a particular PCD 105. The API module 106 may also be used for web hooks with third party integrations and partners as understood by one of ordinary skill in the art.

The Jobs module 108 may run on the server 102A. The Jobs module 108 may support a background service which schedules asynchronous tasks for automated processing and management of the system 101.

The Domain Module 109 is a shared library of Services and Models that may be used by the Admin 104, API 106, and Jobs 108 modules. The Doman Module 109 houses data objects with stored information (Model) and business rules that control how the data can be manipulated (Service). An example of a service might be the data validation that takes place to verify that an e-mail address inputted by the user follows an appropriate format. An example of a model might be a record with all of the attributes of a user's subscription.

The Domain Module 109 may use one or more loyalty tracker rules to award loyalty points to each subscriber of the system 101. A first loyalty rule may provide points based on the subscription flat fee that is paid for the service supplied by the TM-App 103/system 101. A second loyalty rule may provide points based on a number of consecutive time periods (i.e. consecutive number of months) a subscriber has been a member of the service enabled by the TM-App 103. Other rules are possible and are included within the scope of this disclosure.

Exemplary Point tracking rules include the following: Variables=maxAllowedTenureInMonths, baseBoost and loyaltyBoost which may be defined with the Admin module 104.

Rule (1):

tenureMonths=min(memberTenureInMonths,maxAllowedTenureInMonths)

Rule (2):

basePoints=monthlyPrice*baseBoost

Rule (3):

points=(tenureMonths/loyaltyBoost*basePoints)+basePoints

The Domain Module 109 may also track "friends" of subscribers. That is, the Domain Module 109 may track which subscribers attend live events with each particular subscriber. For example, for a first subscriber, The Domain Module 109 may track how many live events the first subscriber attends live events with a second, third, fourth and fifth subscriber. The Domain Module 109 may only retain a predetermined number of subscribers, such as on the order of three, based on their attendance records with the first subscriber. So if the third, fourth, and fifth subscribers had the highest number of attendance records with the first subscriber, then according to one exemplary embodiment, the third, fourth, and fifth subscribers would be identified as the "top three" friends of the first subscriber. However, one of ordinary skill in the art recognizes that any number of "top" friends may be tracked, such as, but not limited to, the top two, four, five, six, seven, etc. friends of the first subscriber.

In other exemplary embodiments, the Domain Module 109 may track a "friends" link between subscribers who were referred by another subscriber. X. Modules 104-109 may reside on a single computer server 102A or they may each reside on separate computer servers 102A (not illustrated in FIG. 1A). The server 102A may be coupled to a communications network 110, which may comprise the Internet. Each of the elements of the system 101 are coupled to the computer communications network 110 via communication links. The communication links illustrated in FIG. 1A may comprise wired and/or wireless communication links. Wireless communication links include, but are not limited to, radio-frequency ("RF") links, such as, BLUETOOTH™ RF links, WIFI™ RF links, as well as infrared links, acoustic links, and other wireless mediums. Each of these elements of the system 101 may be coupled to one another through the computer communications network 110.

The computer communications network 110 may comprise a wide area network ("WAN"), the plain-old-telephone-system ("POTS), a local area network ("LAN"), the Internet, or any combination of these and other networks. Through the network 110, the server 102A may communicate with the computing device 102B/105C of the live event provider [i.e. stadium/live event venue owner].

The computing device 102B/105C for each live event provider has been designated with two reference numerals to demonstrate that a live event provider (i.e. owner of stadium, owner of a sports team, a movie theatre, etc.) could use either a computing device 102B (server, laptop, desktop, etc.) or a portable computing device 105C (tablet pc, mobile phone, etc.) to access the server 102A via the communications network 110. Each member PCD 105A-B that are members of the system/service 101 running the app 103 may also communicate with the server 102A via the communications network 110.

Referring now to FIG. 1B, this figure illustrates how the system 101 of FIG. 1A allows subscribers of the system 101 to easily create group seating arrangements 155 at live events with their portable computing devices 105A, 105B. As noted previously, since the system 101 allows a first subscriber with a first PCD 105A to know the attending status of a second subscriber with a second PCD 105A, the first subscriber with first PCD 105A [or the second subscriber with second PCD 105B] can easily set up a group seating arrangement between the first and second subscribers. The system 101 can transmit an invitation from the first subscriber to the second subscriber if the second subscriber has not currently made a reservation to the live event to be held in venue 112.

Alternatively, if the second subscriber already has a reservation to the live event, the system 101 may send a link request so that the first subscriber and the second subscriber can sit in adjacent [or close to adjacent seats if the group seating arrangement 155 is greater than two subscribers and/or guest passes]. As mentioned above, the exact seat assignment for the group seating arrangement 155 is not created until a few hours prior to the live event. That is, the exact seat assignments [i.e. section, row, and seat number] are not available to the first and second subscribers until check-in with the geofence 118 [FIG. 1A] at the venue 112 has been established as described above.

This means that the system 101 may advise the first and second subscribers with PCDs 105A, 105B that they will be sitting together during the live event. However, the exact seat assignments [i.e. locations] will not be available until check-in with the geo-fence 118 is established at the venue 112.

Referring now to FIG. 2A, this figure illustrates one exemplary embodiment of a screen display 107A for a portable computing device 105 running a ticket management application (TM-App) program 103 when an operator first subscribes to the software service offered by the system 101. The screen display 107A may provide a message 201 that lists the flat fee that is charged for a predetermined period of time, such as $29.00 U.S. dollars a month. As noted above, for this flat fee, a subscriber via the TM-App 103 may make reservations to numerous live events during the subscription period (i.e. here thirty days). The subscriber could make reservations to live events on daily basis and even several live events during a single day. However, the subscriber may be assessed a penalty (i.e. a flat fee penalty) for each live event in which a reservation is made and where the subscriber does not show ("no-show") as determined by the TM-App 103 working in conjunction with the geo-fence 118 assigned to a live event venue 112.

FIG. 2B-1 illustrates one exemplary embodiment of a screen display 107B-1 for a portable computing device running a ticket management application program that displays a listing of live events available to a subscriber of the system 101. According to the exemplary embodiment of FIG. 2B-1, three live events available to the subscriber are listed on the display 107B-1.

Referring now to FIG. 2B-2, this figure illustrates one exemplary embodiment of a screen display 107B-2 for a portable computing device 105 running a ticket management application (TM-App) program 103 that displays event information as well as a subscriber friend status indicator 203. This screen display 107B-2 is generated in response to a selection of the third event listed in screen display 107B-1 of FIG. 2B-1.

As noted above, one of the unique features of the system 101 is the ability of the server 102A to track friends of a subscriber and the status of one or more friend's attendance for a particular live event. In the exemplary embodiment illustrated in FIG. 2B-2, the friend status indicator 203 presents information to the subscriber indicating one or more friends are attending the comedy night that is described in this display 107B. According to this particular exemplary embodiment, that name of the friend, Ben, is displayed as a friend who is attending comedy show. As noted above, a "friend" is determined by the server based on a frequency in which the subscriber attends multiple events with the subscriber. According to this embodiment, only the single friend of Ben Bussard is displayed. However, additional friend's names could be displayed if such friends meet the threshold attendance requirements as determined by the system 101/server 102A.

Referring now to FIG. 2C, this figure illustrates one exemplary embodiment of a screen display 107C for a portable computing device 105 running a ticket management application (TM-App) program 103 that produces a message 205 and confirmation on-screen button about the cancellation policy for reservations made with the system 101. According to this exemplary embodiment, the message 205 states that a subscriber can cancel up to three (3) tickets per subscription period (i.e. month) for free and up to twenty-four hours before a live event. However, other time periods for the subscription period, timing before the live event, and the number of cancelled tickets permitted are possible and are included within the scope of this disclosure. If the subscriber agrees to the cancellation policy, the on-screen button of "Let's do this!" may be selected.

Figure 2F:
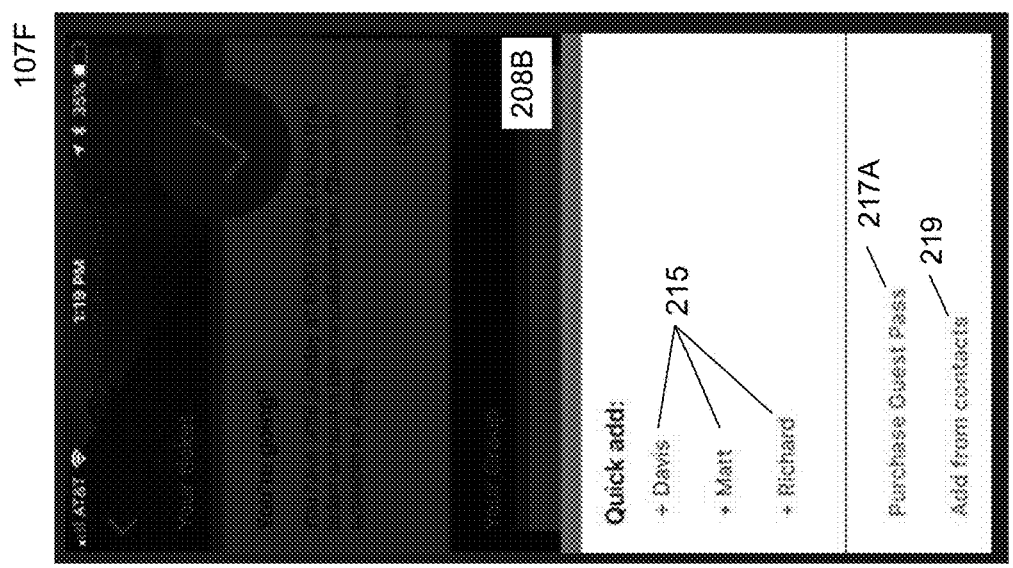
FIG. 2F illustrates one exemplary embodiment of a screen display for a portable computing device running a ticket management application (TM-App) program that produces a message 208B that is generated in response to an option presented in the screen display of FIG. 2D.
Figure 2E:
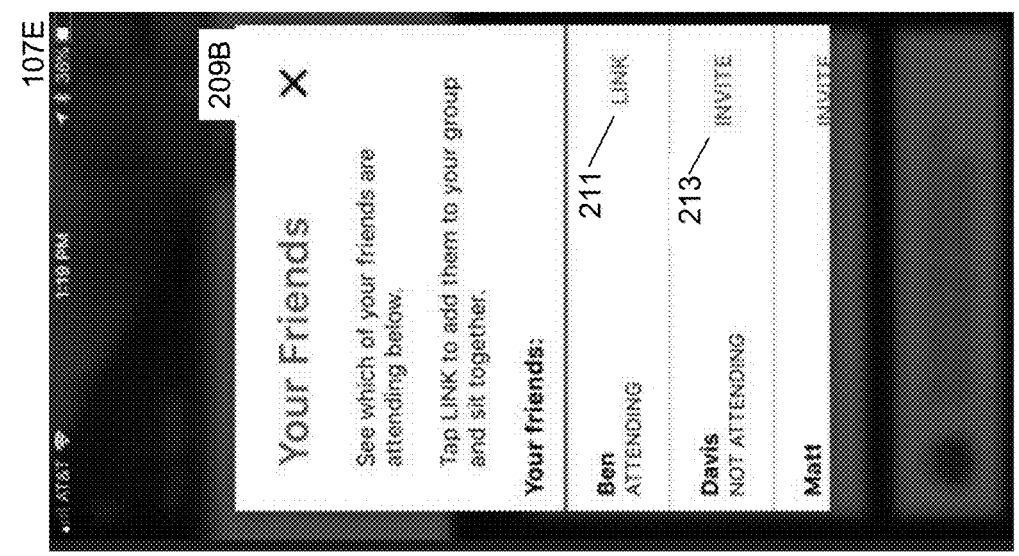
FIG. 2E illustrates one exemplary embodiment of a screen display for a portable computing device running a ticket management application (TM-App) program that produces a message that is generated in response to an option presented in the screen display of FIG. 2D.
Figure 2D:
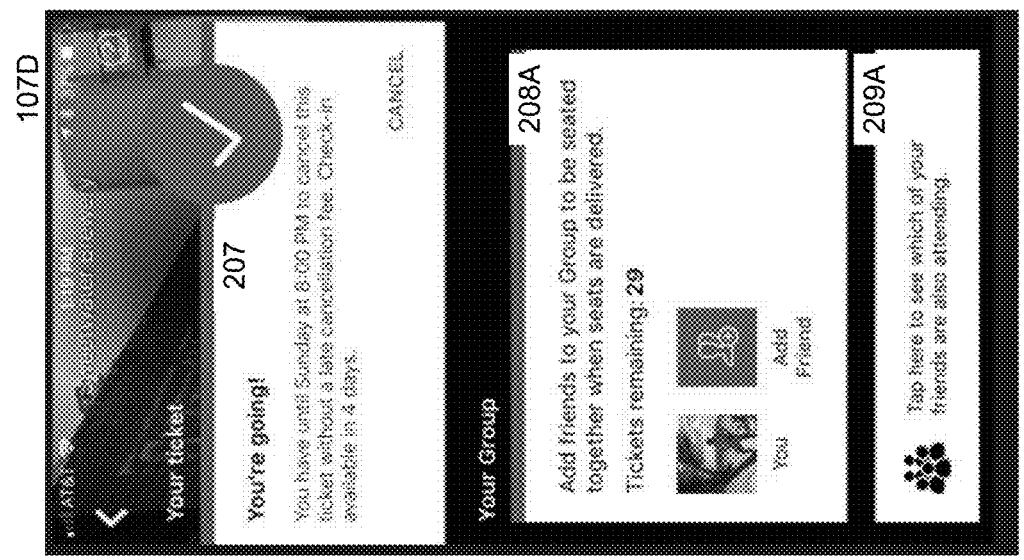
FIG. 2D illustrates one exemplary embodiment of a screen display for a portable computing device running a ticket management application (TM-App) program that produces a message that confirms a reservation to a live event has been made and also requests input if the subscriber desires to create a group seating arrangement among other subscriber friends for the live event.

Referring now to FIG. 2D, this figure illustrates one exemplary embodiment of a screen display 107D for a portable computing device 105 running a ticket management application (TM-App) program 103 that produces a message 207 that confirms a reservation to a live event has been made and also requests input if the subscriber desires to create a group seating arrangement among other subscriber friends for the live event. The screen display 107D may show a confirmation of the reservation and an option to cancel which may be selected to cancel/stop the reservation.

In the exemplary embodiment of FIG. 2D, the subscriber may form a group seating arrangement by at least one of two ways: by selecting an option 208A to manually add subscriber friends to a live event or by selecting an option 209A to which see subscriber friends may already be attending the live event. As noted previously, the system 101 may track how many live events in which two or more subscribers attend together.

And based on this joint attendance or group seating arrangement, the system 101 may determine other subscribers who are "friends" of a particular subscriber purely based on ranking the attendance/group seating tracking. However, other exemplary embodiments are possible where the system 101 may track "friends" of the subscriber based on the subscriber advising the system 101 that particular subscribers are actual "friends" of the subscriber. Other combinations and permeations are possible and are included within the scope of this disclosure.

Referring now to FIG. 2E, this figure illustrates one exemplary embodiment of a screen display 107E for a portable computing device 105 running a ticket management application (TM-App) program 103 that produces a message 209B that is generated in response to an option 209A presented in the screen display 107D of FIG. 2D. Specifically, screen display 107E and message 209B having a menu are generated in response to the subscriber selecting the option 209A of FIG. 2D to see which of the subscriber's friends are also attending the live event in which a reservation was made.

The message 209B of FIG. 2E may list "friends" of the subscriber and their respective attending status for the live event in which a reservation was made by the subscriber as confirmed by message 207 of FIG. 2D. In addition to providing the attending status for a friend (either attending or not attending), message 209B may also provide one or more options to arrange for group seating with one or more of the listed friends. For those friends not attending (i.e. such as Davis and Matt in the example of FIG. 2E), a subscriber may select an invite option 213 meaning that the system 101 can send messages to these friends not attending to determine if they would like to accept and sit with the subscriber friend who selected the invite option 213.

For those friends already attending (i.e. such as Ben in the example of FIG. 2E), the subscriber may select a link option 211 so that the selected friend and the subscriber can create a group seating arrangement if the attending friend (i.e. Ben) accepts the link request. The system 101 is not limited to the format and context of the exemplary displays shown for these options 211, 213 and the attending status information. That is, other displays and menu combinations for this information and input requests are possible and are included within the scope of this disclosure, such as, but not limited to, radio-type buttons, tables, on-screen buttons, etc. which can be selected/activated by the subscriber via the TM-App 103.

Referring now to FIG. 2F, this figure illustrates one exemplary embodiment of a screen display 107F for a portable computing device 105 running a ticket management application (TM-App) program 103 that produces a message 208B that is generated in response to an option 208A presented in the screen display 107D of FIG. 2D. Specifically, screen display 107F and message 208B having a menu are generated in response to the subscriber selecting the option 208A of FIG. 2D to quickly add ("quick-add") friends to the the live event in which a reservation was made.

This message 208B lists three subscriber friends selectable links 215 who can be quickly added to the live event in order to create a group seating arrangement. When the subscriber selects one of the links 215, the subscriber friend will receive either a link request (if he/she has already made a reservation to the live event) or an invite request (if she/he has not made a reservation to attend the live event). Fewer or greater than three subscriber friends may be listed for this quick-add feature as understood by one of ordinary skill in the art. Link requests and invite requests are discussed above in connection with FIG. 2E.

In addition to the selectable links 215, the message 208B may present an option 217A to purchase a guest pass without providing a name of the guest and an option 219 to add a subscriber friend from a contact list stored on the portable computing device 105 (i.e. mobile phone). Guest passes may be purchased at cost by the subscriber as will be explained below in connection with FIG. 2G.

Figure 2I:
FIG. 2I illustrates one exemplary embodiment of a screen display for a portable computing device running a ticket management application (TM-App) program that produces a message that confirms a reservation to a live event has been made and displays a guest pass indicator.
Figure 2H:
FIG. 2H illustrates one exemplary embodiment of a screen display for a portable computing device running a ticket management application (TM-App) program that produces a message and confirmation on-screen button about the cancellation policy for reservations, including guest passes, made with the system.
Figure 2G:
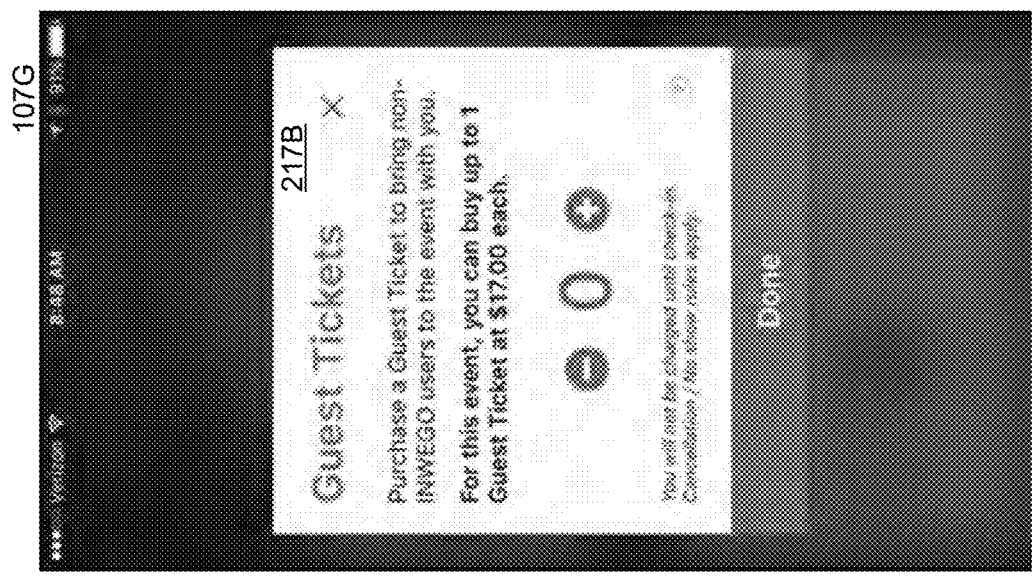
FIG. 2G illustrates one exemplary embodiment of a screen display for a portable computing device running a ticket management application (TM-App) program that produces a message for requesting input on a number of guest passes desired by a subscriber.

Referring now to FIG. 2G, this figure illustrates one exemplary embodiment of a screen display 107G for a portable computing device 105 running a ticket management application (TM-App) program 103 that produces a message 230 for requesting input on a number of guest passes desired by a subscriber. This message 217B may be produced in response to the subscriber selecting the option 217A of FIG. 2F for adding one or more guest passes to a reservation. As noted previously, guest passes for a live event are for non-subscribers of the system 101. The message 217B may comprise an input section where the subscriber may select any number of guest passes.

The server 102A may set a limit on the number of guest passes available for a particular live event based on inventory, present state of group seating arrangements 155, limits placed by the event provider, and other factors. Any limits on the number of guest passes available may be displayed in message 217B. The message 217B may also display the cancellation policy for the guest passes. Usually, guest passes may be cancelled similar to regular subscriber reservations: typically within a predetermined number of hours prior to the day of the event. In some exemplary embodiments, the predetermined number of hours is usually about 24.0 but other amounts are possible and are included within the scope of this disclosure.

Referring now to FIG. 2H, this figure illustrates one exemplary embodiment of a screen display 107H for a portable computing device 105 running a ticket management application (TM-App) program 103 that produces a message 205 and confirmation on-screen button about the cancellation policy for reservations, including guest passes, made with the system 101. FIG. 2H is similar to screen display 107C of FIG. 2C but this one of FIG. 2H is produced after a guest pass reservation has been selected in FIG. 2G.

Referring now to FIG. 2I, this figure illustrates one exemplary embodiment of a screen display 107I for a portable computing device 105 running a ticket management application (TM-App) program 103 that produces a message that confirms a reservation to a live event has been made and displays a guest pass indicator 235. The guest pass indicator 235 tells the subscriber how many guest passes have been purchased for a live event. In the exemplary embodiment of FIG. 2I, only one guest pass was purchased so the subscriber's name and/or symbol is displayed along with a parenthetical expression of "(+1)" for the guest pass indicator 235.

Other graphical displays, besides the parenthetical expression, are possible for the guest pass indicator 235 and are included within the scope of this disclosure as understood by one of ordinary skill in the art. Screen 107I may also receive input if the subscriber desires to create a group seating arrangement among other subscriber friends for the live event by selecting the add a subscriber friend option, similar to option 208A of FIG. 2D described above.

Figure 2L:
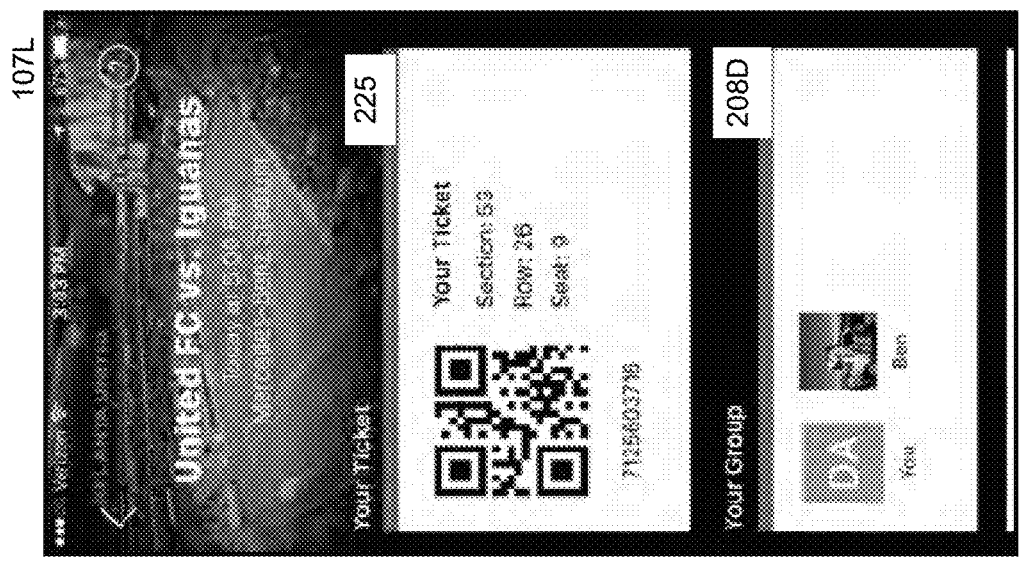
FIG. 2L illustrates one exemplary embodiment of a screen display for a portable computing device running a ticket management application (TM-App) program that produces a message which lists an actual location of a seat within the venue for a live event.
Figure 2K:
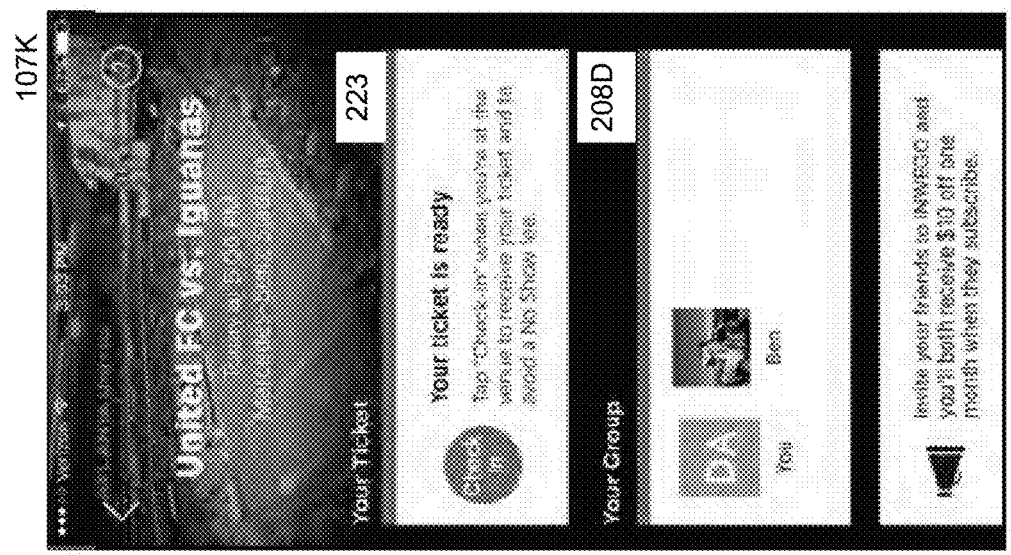
FIG. 2K illustrates one exemplary embodiment of a screen display for a portable computing device running a ticket management application (TM-App) program that produces a message that indicates the subscriber's ticket is ready when the subscriber "checks-in" at the venue as illustrated in FIG. 1.
Figure 2J:
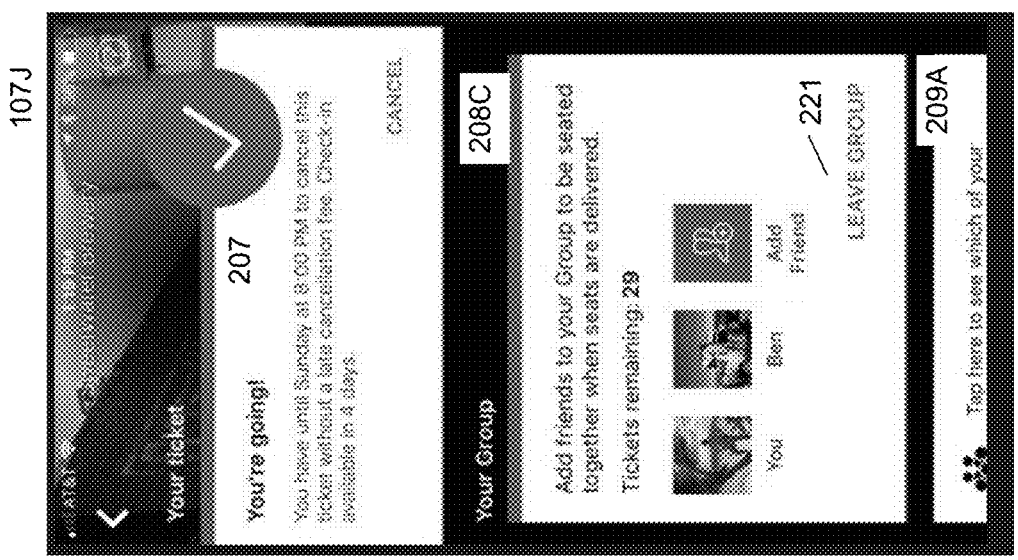
FIG. 2J illustrates one exemplary embodiment of a screen display for a portable computing device running a ticket management application (TM-App) program that produces a message that confirms a reservation to a live event has been made and also requests input if the subscriber desires to create a group seating arrangement among other subscriber friends for the live event or if the subscriber wants to leave the group seating arrangement.

Referring now to FIG. 2J, this figure illustrates one exemplary embodiment of a screen display 107J for a portable computing device 105 running a ticket management application (TM-App) program 103 that produces a message 207 that confirms a reservation to a live event has been made and also requests input if the subscriber desires to create a group seating arrangement among other subscriber friends for the live event or if the subscriber wants to leave the group seating arrangement. The screen display 107G is similar to the screen display 107D of FIG. 2D except that in option 208C for adding a friend in FIG. 2J, the friend of "Ben" has been added compared to option 208A of FIG. 2D. A subscriber with option 208C may add additional friends for the group seating arrangement listed in this display 107J. According to the exemplary embodiment of FIG. 2J, a group seating arrangement now exists and includes the subscriber and the subscriber's friend, Ben.

Alternatively, the subscriber may remove himself/herself from the group seating arrangement by selecting option 221. When option 221 is selected to leave the group, a message may be sent to other members of the group seating arrangement. In this example, a message can be sent to the subscriber friend, Ben, to advise that the subscriber has elected to leave the group seating arrangement. As noted previously, other displays and menu combinations for this information and input requests are possible and are included within the scope of this disclosure, such as, but not limited to, radio-type buttons, tables, on-screen buttons, etc. which can be selected/activated by the subscriber via the TM-App 103.

Referring now to FIG. 2K, this figure illustrates one exemplary embodiment of a screen display 107K for a portable computing device 105 running a ticket management application (TM-App) program 103 that produces a message 223 that indicates the subscriber's ticket is ready when the subscriber "checks-in" at the venue 112 as illustrated in FIG. 1A. As noted above, the subscriber "checks-in" at the venue 112 of FIG. 1A when the PCD 105 is physically located within the geo-fence 118 that is tracked by the GPS unit of the PCD 105 working with the TM-App 103.

The message 223 of FIG. 2K may also remind the subscriber of the penalty: the no-show fee which may be assessed after making a reservation with the system 101 if the subscriber does not check-in at the live event within venue 112. The exemplary screen display 107K may also display the group seating arrangement that was created with option 208. In this exemplary screen display 107H of FIG. 2K, the group seating arrangement includes two subscribers: the present subscriber and the subscriber friend named "Ben."

Referring now to FIG. 2L, this figure illustrates one exemplary embodiment of a screen display 107L for a portable computing device 105 running a ticket management application (TM-App) program 103 that produces a message 225 that lists an actual location of a seat within the venue 112 for a live event. The exemplary screen display 107L with message 225 is generated in response to a subscriber "checking-in" at a venue 112 for a live event. As noted above, the subscriber "checks-in" at the venue 112 of FIG. 1A when the PCD 105 is physically located within the geo-fence 118 that is tracked by the GPS unit of the PCD 105 working with the TM-App 103.

Message 225 may comprise a machine-readable code for conveying a seat assignment for the subscriber within the venue 112 as well as human readable information conveying the seat assignment. The machine-readable code may comprise a two-dimensional bar-code. However, other machine readable codes, like 1-D bar codes, as well as machine-to-machine relayed codes like near-field-communication (NFC) transmissions and Bluetooth transmitted codes are possible and are included within the scope of this disclosure. The machine-readable codes can used individually and/or in combination as understood by one of ordinary skill in the art. The human readable information may comprise a section number, row number, a seat number, etc. which are usually dependent on the venue 112.

Figures 2N, 2O, 2P:
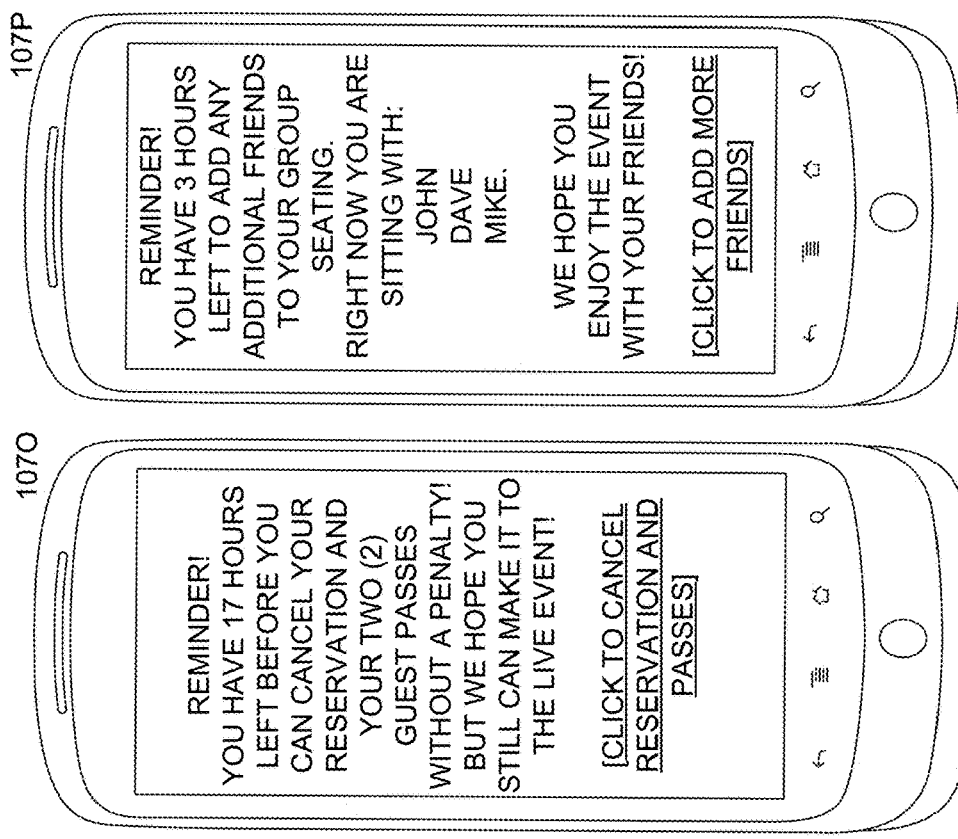
FIG. 2N illustrates one exemplary embodiment of a screen display for a portable computing device running a ticket management application (TM-App) program that produces a message listing the rewards points history of a subscriber of the system.
FIG. 2O illustrates one exemplary embodiment of a screen display for a portable computing device running a ticket management application (TM-App) program that produces an optional message that informs a subscriber of an amount of time remaining to cancel a reservation without a penalty.
FIG. 2P illustrates one exemplary embodiment of a screen display for a portable computing device running a ticket management application (TM-App) program that produces a message that informs a subscriber of an amount of time remaining to add additional friends to a group seating arrangement or to create a group seating arrangement at a live event in the venue.
Figure 2M:
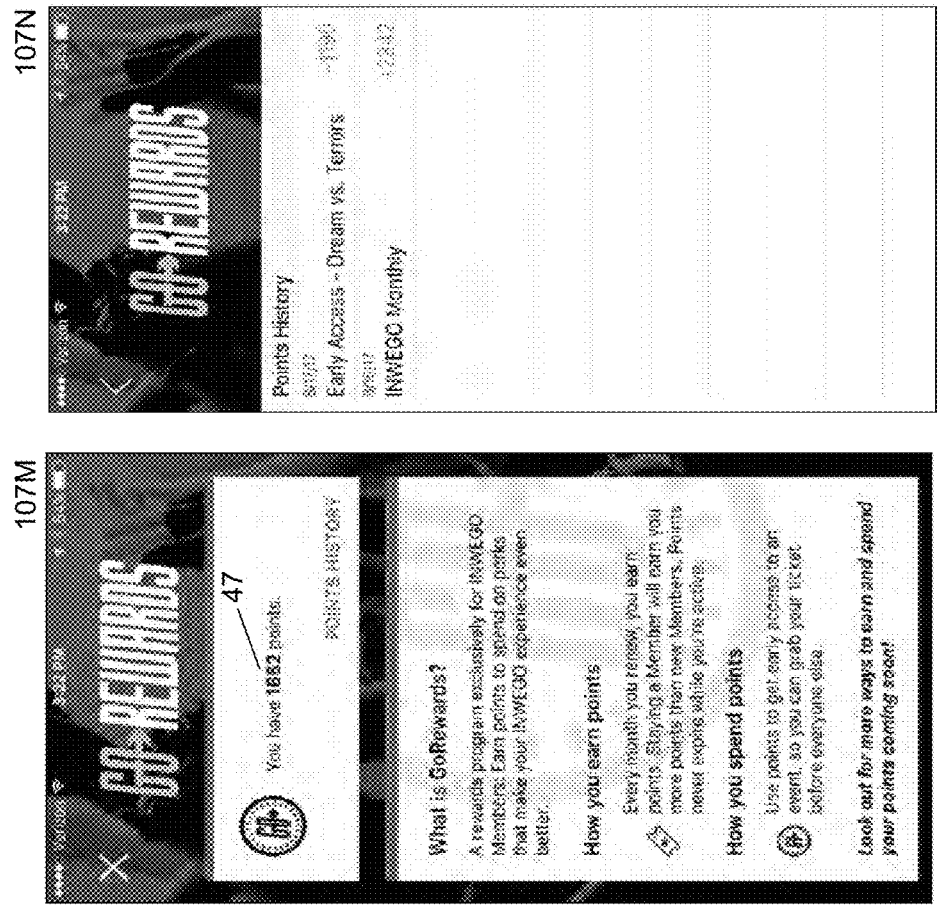
FIG. 2M illustrates one exemplary embodiment of a screen display for a portable computing device running a ticket management application (TM-App) program that produces a message displaying a subscriber's reward point balance that is tracked by the server.

Referring now to FIG. 2M, this figure illustrates one exemplary embodiment of a screen display 107M for a portable computing device 105 running a ticket management application (TM-App) program 103 that produces a message displaying a subscriber's rewards points balance 47 that is tracked by the server 102A. The top section of screen display 107M lists the subscriber PCD 105 point balance along with a link to view their point history. A member PCD 105 can navigate to FIG. 2N by clicking 'POINTS HISTORY' in the top section of screen display 107M. The lower section of screen display 107M may describe the rewards program, with information on how to earn and spend points. A member PCD 105 can navigate back to FIG. 22A by selecting screen controls in the upper left hand corner.

As mentioned above, the Domain Module 109 may use one or more loyalty tracker rules to award loyalty points to each subscriber of the system 101. A first loyalty rule may provide points based on the subscription flat fee that is paid for the service supplied by the TM-App 103. A second loyalty rule may provide points based on a number of consecutive time periods (i.e. consecutive number of months) a subscriber has been a member of the service enabled by the TM-App 103. Other rules are possible and are included within the scope of this disclosure.

Referring now to FIG. 2N, this figure illustrates one exemplary embodiment of a screen display 107N for a portable computing device 105 running a ticket management application (TM-App) program 103 that produces a message listing the rewards points history of a subscriber of the system 101. The history may show points earned as well as points used towards one or more rewards. As noted previously, at least one reward that may be earned with the system 101 is securing early access for making reservations to a live event. For subscribers who do not have a threshold level of points for a particular live event, such subscribers with a lower than threshold balance may need to wait for a regular reservation window and are not permitted during an early access window. The threshold level of points for early access to make a reservation for a live event may be set manually or automatically by the server 102A. The threshold level may also be set by either an administrator of the system 101 or by the computing device 102B/105C of the event provider.

As noted above, a member PCD 105 can earn points by renewing their subscription to the system 101. As a member PCD 105's tenure increases, the number of points that they receive per subscription period [i.e. such as, but not limited to, a monthly subscription period] increases. Member PCDs 105 can spend points to gain early access to reserve a spot at an event before a general access or general availability window for a live event at a venue 112.

Referring now to FIG. 2O, this figure illustrates one exemplary embodiment of a screen display 107O for a portable computing device 105 running a ticket management application (TM-App) program 103 that produces an optional message that informs a subscriber of an amount of time remaining to cancel a reservation without a penalty. Screen display 107O corresponds with step 381 of FIG. 3E described in more detail below. Screen display 107O is optional. However, it may be helpful to subscribers in that it may help eliminate no-shows for a venue 112.

Referring now to FIG. 2P, this figure illustrates one exemplary embodiment of a screen display 107P for a portable computing device 105 running a ticket management application (TM-App) program 103 that produces a message that informs a subscriber of an amount of time remaining to add additional friends to a group seating arrangement or to create a group seating arrangement at a live event in the venue 112. Screen display 107P corresponds with step 387 of FIG. 3E described in more detail below. Screen display 107P is also optional. However, it may increase attendance for a live event at the venue 112 since a subscriber may think of additional friend subscribers after the initial reservation is made.

Figure 3A:
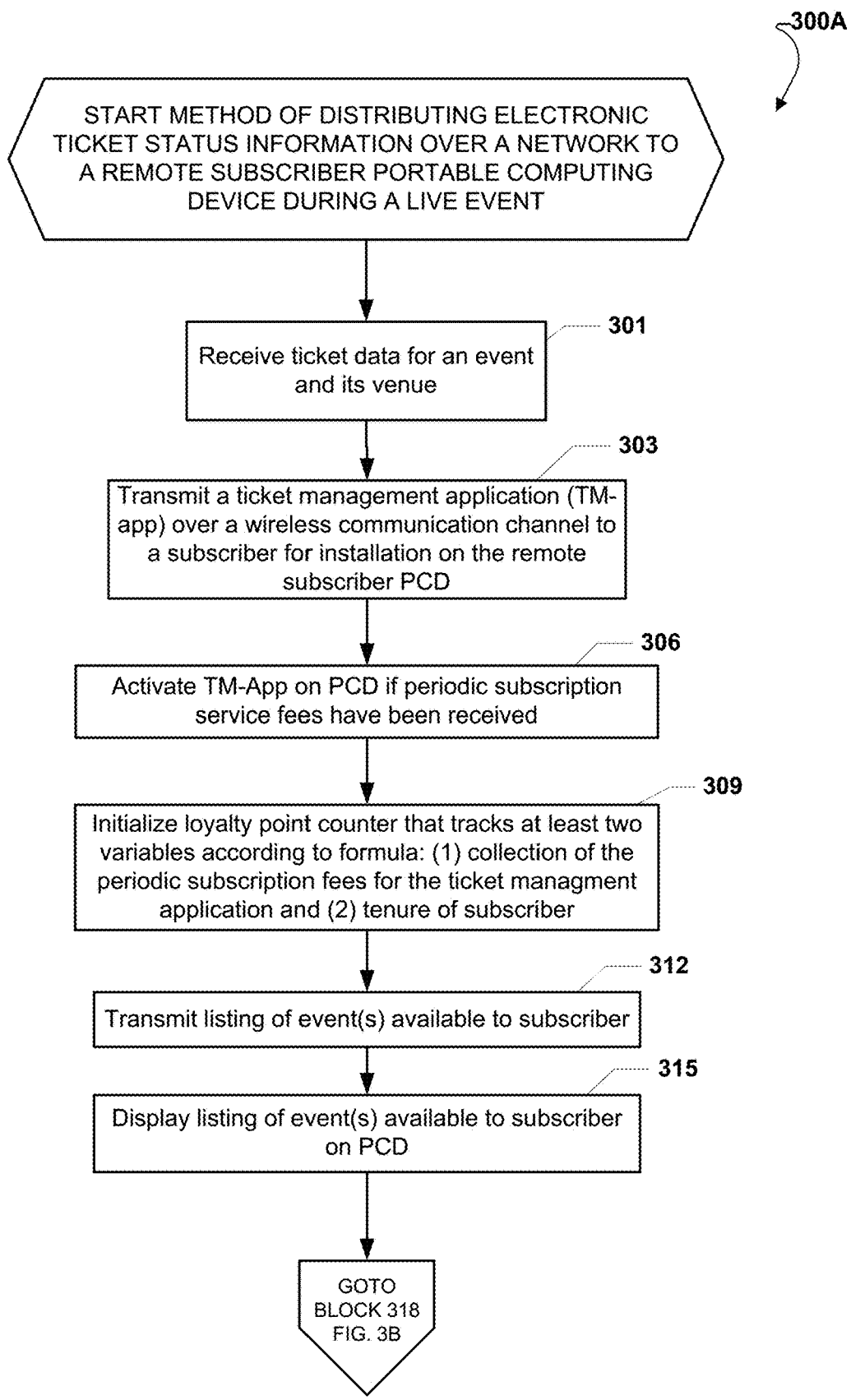
FIG. 3A illustrates a flow chart of a method for distributing electronic ticket status information for a live event over a network to remote subscriber portable computing devices according to one exemplary embodiment.

FIG. 3A illustrates a flow chart of a method 300A for distributing electronic ticket status information for a live event over a network 110 to remote subscriber portable computing devices 105 according to one exemplary embodiment. Block 301 is the first step of method 300A.

In Step 301, the server 102A of FIG. 1A may receive ticket data from the computing device 102B/105C of the live event provider. As noted previously, a live event may comprise a music concert, a musical, a movie, a comedy show, a sporting event, a local festival, etc. Also, a live event may or may not have seat assignments. For example, for a local festival, the system 101 may provide for gate admission without any seat assignments if no seats are provided at the live event.

The ticket data from the event provider may comprise a number of seats that the event provider may make available for purchase by the system 101. The ticket data may also indicate if the live event is one in which early access may be provided to subscribers with a higher loyalty balance relative to other subscribers of the system 101.

The ticket data may or may not have seat assignments and/or exact locations of the seats in the venue 112. In situations where the event provider has only provided a number of seats available without any specifics on seat location, the event provider has the advantage of waiting until about twenty-four hours prior to the live event in order release exact locations of seats available to the system 101. In this way, the event provider may attempt to keep premium seats available for sale closer to the date of the live event and then only provide less premium seats to the system 101 if all premium seats to a venue 112 have been sold. Otherwise, if premium seats remain in the venue 112 within twenty-four hours of the live event date, the event provider can then supply premium seats and less premium seats (and any combination thereof) to the system 101.

In step 303, the system 101, and specifically, the server 102A, may transmit the ticket management application (TM-App) 103 over a wireless communication channel supported by the computer network 110 for installation on a remote subscriber PCD 105, as illustrated in FIG. 1A. In other exemplary embodiments, other servers 102, such as those from the GOOGLE™ Play/App store or the Apple™ App store may transmit the TM-App 103 to the PCD 105. In step 306, the server 102A may activate the TM-App 103 if periodic subscription service fees have been received. Alternatively, the TM-App 103 may allow navigation/browsing, however, any reservation attempts may be blocked for operators/users who are not current with their monthly subscription fees. Step 306 corresponds with exemplary screen display 107A of FIG. 2A in which the terms and/or conditions for the subscription service are displayed to the operator of a PCD 105. The server 102A may create an account for each subscriber and it may track payment information such as checking account information, credit card information, debit card information etc. as well the billing address for an operator of a PCD 105 who desires to become a subscriber and agreeing to the terms and/or conditions listed in FIG. 2A. In one or more exemplary embodiments, the TM-App 103 may allow the browsing/review of live events even if the operator of the PCD 105 has downloaded the TM-App 103 but has not registered/signed-up for services.

In step 309, once the TM-App 103 has been activated in step 306, the server 102A via the domain module 109 may initialize a loyalty point counter that tracks at least two variables according to a formula: (1) collection of the periodic subscription fees for the TM-App 103; and (2) the tenure [the length of sequential payments] for a subscriber relative to the system 101. The loyalty points tracked by the server 102A for each PCD 105 allows the system 101 to offer preferential treatment for subscribers with higher loyalty point values relative to other subscribers of the system 101. For example, the system 101 may allow subscribers with higher loyalty point values to secure early reservations for live events compared to subscribers with lower loyalty point values.

In step 312, the system 101 may transmit a listing of one or more live events to the TM-App 103 running on a PCD 105. Next, in step 315, the TM-App 103 may display the listing of live events available to the subscriber on the display device for the PCD 105 as illustrated in FIG. XX. Next, the method 300A continues to decision block 318 of the continuation-method 300B illustrated in FIG. 3B.

Figure 3B:
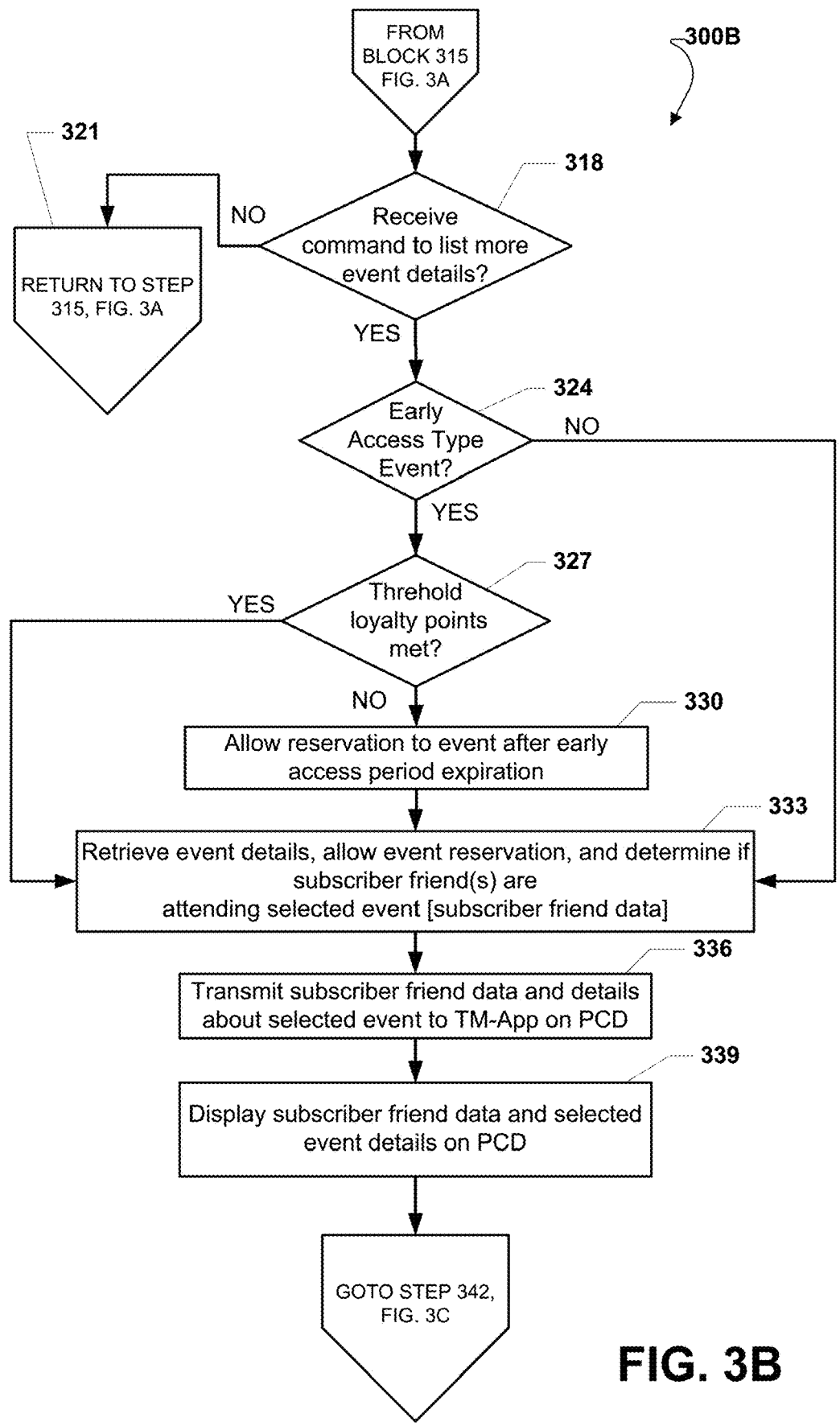
FIG. 3B illustrates a continuation-method/continuation of the flow chart relative to the method illustrated in FIG. 3A.

Referring now to FIG. 3B, this figure illustrates a continuation-method 300B relative to the method 300A of FIG. 3A. In decision block 318, that continues from block/step 315 of FIG. 3A, the server 102A determines if it has received a command to list more details for a live event that is selected by a subscriber from the screen display 107B-1 of FIG. 2B-1. If the inquiry to decision step/block 318 is negative, then the "No" branch is followed back to block 321 in which the method 300 returns back to step 315 of FIG. 3A.

If the inquiry to decision block 318 is positive, then the "Yes" branch is followed to decision block 324. In decision block 324, the server 102A determines if the selected live event is one with early access in which subscribers with a threshold loyalty point balance are granted early access to a live event for making reservations relative to subscribers who may have loyalty point balances below the threshold loyalty point balance. The threshold loyalty point balance may be automatically set by the system 101 or manually by an operator of the system 101.

If the inquiry to decision block 324 is positive meaning that the live event selected by the subscriber is an early access type event, then the "Yes" branch is followed to decision block 327. If the inquiry to decision block 324 is negative, then the "No" branch is followed to block 333.

In decision step/block 327, the server 102A determines if the subscriber has the threshold loyalty point balance set/established by the system 101 for the live event. Specifically, the domain module 109 of the server 102A may provide what the current loyalty balance is for a particular describer as described above. If the inquiry to decision step 327 is positive, meaning that the subscriber has the requisite loyalty point balance threshold for the early access event, then the "Yes" branch is followed to block 333.

If the inquiry to decision block 327 is negative, then the "No" branch is followed to step 330. In step 330, the system 101 will allow a subscriber who does not have the requisite loyalty balance threshold set for an early access live event to make a reservation to the live event after a predetermined period of time and/or after a threshold number of tickets have been reserved for a live event.

Next, in step 333, the server 102A may then retrieve event details from its internal storage (i.e. memory), permit a reservation to the live event [as appropriate], and determine if friend(s) of the subscriber are attending the selected live event. In this step/block 333, the server 102A may make an inquiry with the domain module 109 which tracks subscriber friend data.

As noted previously, the Domain Module 109 may also track "friends" of subscribers. That is, the Domain Module 109 may track which other subscribers attend live events with each particular subscriber. For example, for a first subscriber, the Domain Module 109 may track how many live events the first subscriber attends live events with a second, third, fourth and fifth subscriber. The Domain Module 109 may only retain a predetermined number of subscribers, such as on the order of three, based on their attendance records with the first subscriber.

So if the third, fourth, and fifth subscribers had the highest number of attendance records with the first subscriber, then according to one exemplary embodiment, the third, fourth, and fifth subscribers would be identified as the "top three" friends of the first subscriber. However, one of ordinary skill in the art recognizes that any number of "top" friends may be tracked, such as, but not limited to, the top two, four, five, six, seven, etc. friends of the first subscriber based on group seating of subscribers and their checked-in status for live events at venues 112.

Alternatively, or in addition to tracking the top subscriber "friends" based on attendance records, the system 101 may also track subscriber friends based on referrals that subscriber makes to non-subscribers. That is, the system 101 may track subscriber friends based on invitations/referrals that a subscriber sends to non-subscribers who are likely "real" friends with the subscriber sending the invitation.

Next in block 336, the server 102A transmits the subscriber friend data and details about the selected live event over the communications network 110 to the TM-App 103 running on the PCD 105. Subsequently, in step 339 the TM-App 103 displays the subscriber friend data and the selected live event details such as illustrated in FIG. 2B-2. Particularly, see the subscriber friend indicator 203 of screen display 107B of FIG. 2B-2.

Figure 3C:
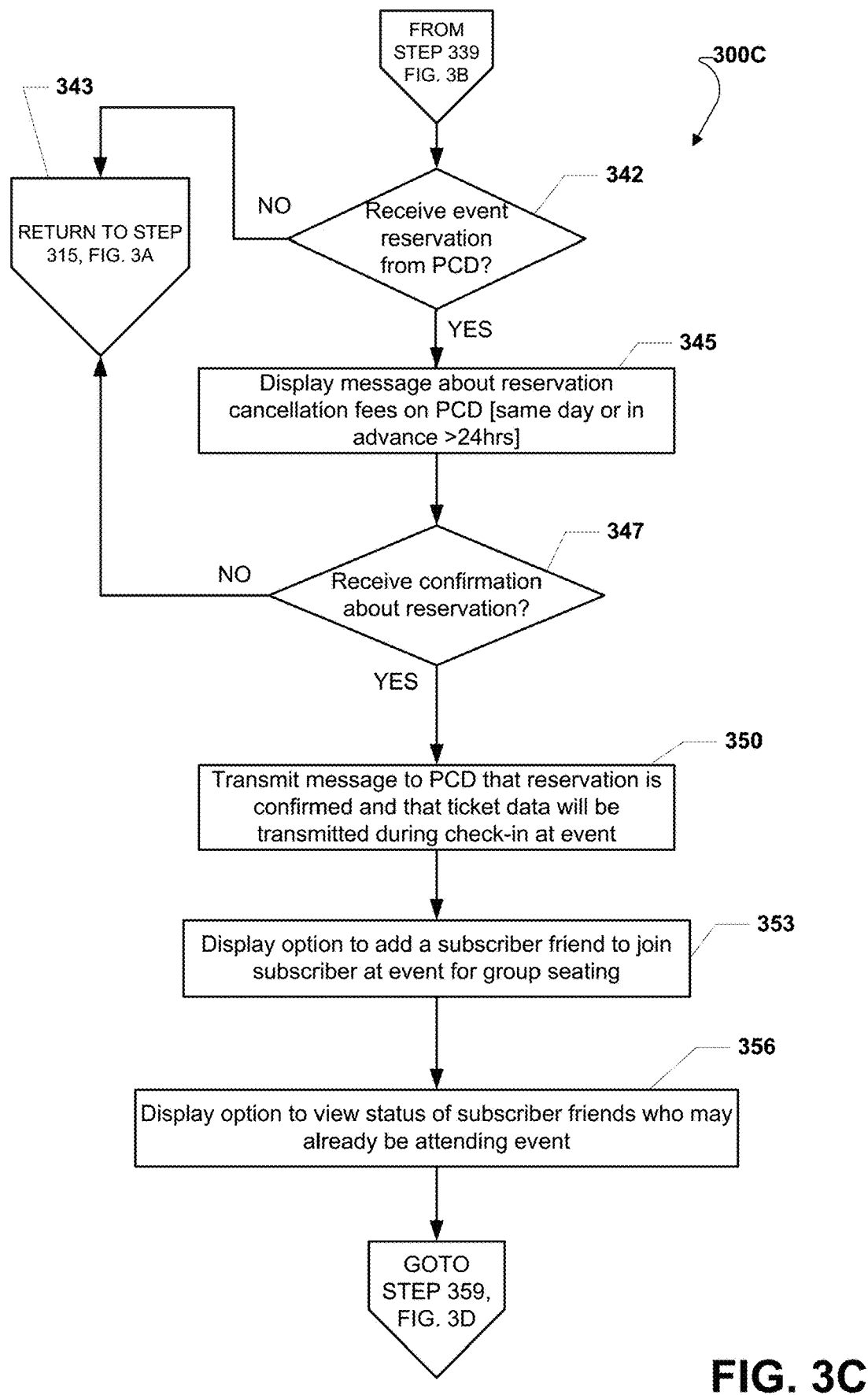
FIG. 3C illustrates a continuation-method/continuation of the flow chart relative to the method illustrated in FIG. 3B.

After block 339, the method 300B of FIG. 3B continues to block 342 of method 300C illustrated in FIG. 3C. Referring now to FIG. 3C, this figure illustrates a continuation-method 300C relative to the method 300B of FIG. 3B. In decision block 342, that continues from block/step 339 of FIG. 3B, the server 102A determines if the TM-App 103 has generated a reservation message based on the screen display as illustrated in screen display of 107B of FIG. 2B. If the inquiry to decision step 342 is negative, meaning that the subscriber rejected or decided against making a reservation, the "No" branch is followed in block 343 which returns the method 300 back to step 315 of FIG. 3A.

If the inquiry to decision block 342 is positive, then the "Yes" branch is followed to step/block 345. In step 345, the server 102A sends a message to the TM-App 103 for displaying to the subscriber which indicates the cancellation policy for the selected live event, such as illustrated in the screen display 107C of FIG. 2C. The cancellation policy may include cancellation/penalty fees as described above. The cancellation policy may be unique to each live event and/or it may be uniform as understood by one of ordinary skill in the art.

In decision block 347, the server 102A determines if it has received a reservation confirmation from the TM-App 103 in response to the cancellation policy screen display 107C of FIG. 2C. If the inquiry to decision step 347 is negative, meaning the subscriber does not want to take the reservation after considering the cancellation policy, the method 300C proceeds to block 343 in which the method returns to Step 315 of FIG. 3A.

If the inquiry to decision block 347 is positive, then the "Yes" branch is followed to block 350 in which the server 102A transmits a message to the TM-App 103 on the PCD 105 that the reservation is confirmed and the ticket for the live event will be transmitted to the PCD 105 during "check-in" at the live event. See, for example, screen display 107D of FIG. 2D. As noted previously, to become "checked-in" at the venue 112 for the live event, the TM-App 103 must sense "entry" into a geo-fence 118 that is positioned around the venue 112 by the system 101. The geo-fence 118 may be tracked by the TM-App 103 working with the GPS unit of the PCD 105. The geo-fence 118 and the "check-in" process are elements that the system 101 uses to track attendance to a live event at a venue 112 by a subscriber of the system 101.

In step 353, an option 208A to add a subscriber friend to join the subscriber at the live event for group seating arrangement may be displayed on the display device of the PCD 105. This add a subscriber friend option 208A may be part of the reservation confirmation message as illustrated in the screen display 107D of FIG. 2D.

In step 356, an option 209A to see other friend subscribers who may be attending the live event may be displayed on the display device of the PCD 105. This see other friend subscribers attending option 209A may also be part of the reservation confirmation message as illustrated in the screen display 107D of FIG. 2D.

Figure 3D:
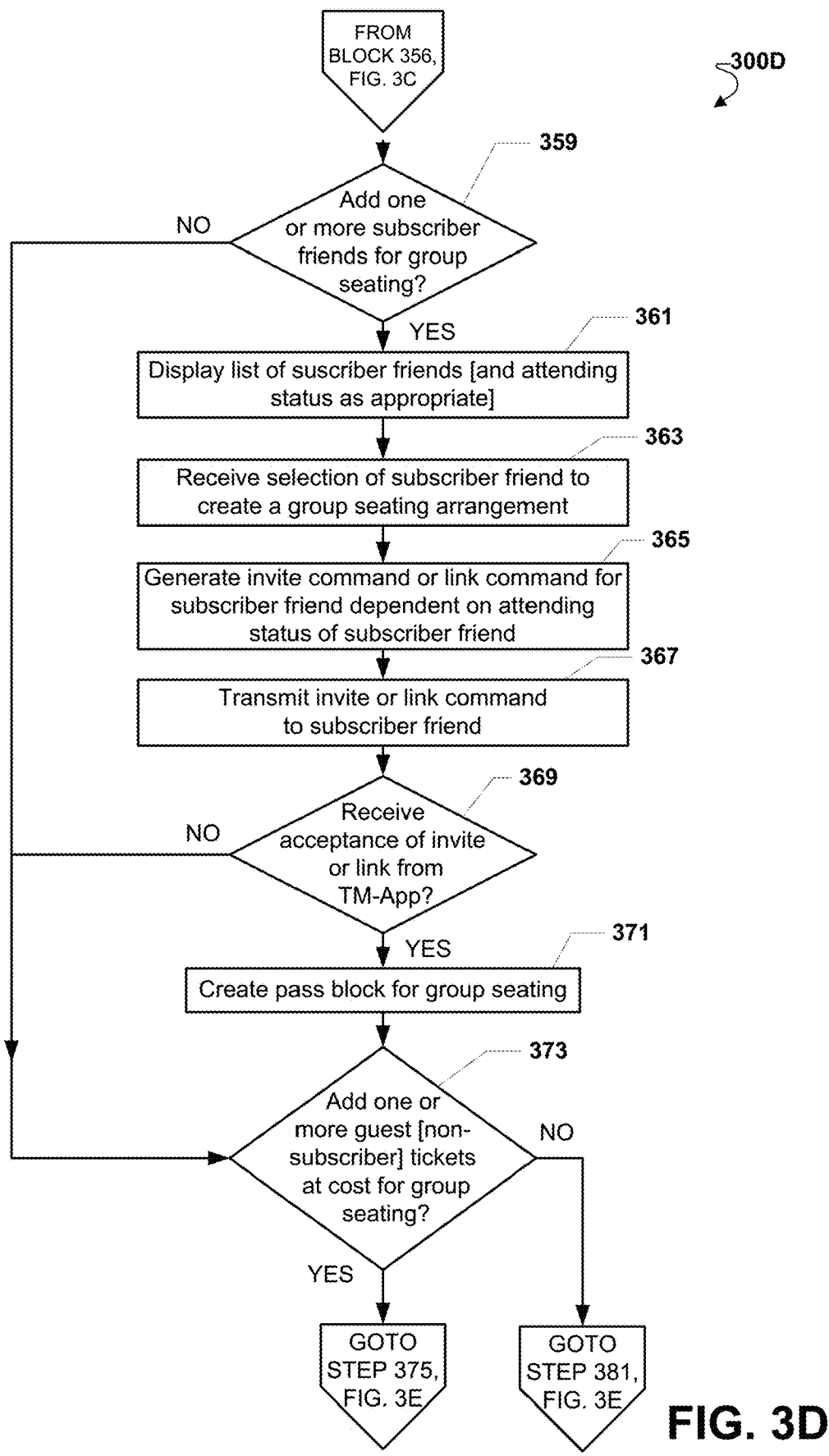
FIG. 3D illustrates a continuation-method/continuation of the flow chart relative to the method illustrated in FIG. 3C.

After block 356, the method 300C of FIG. 3C continues to decision block 359 of method 300D illustrated in FIG. 3D. Referring now to FIG. 3D, this figure illustrates a continuation-method 300D relative to the method 300C of FIG. 3D. In decision step 359, the server 102A determines if option 208A or Option 209A of screen display 107D of FIG. 2D has been selected to add one or more friends for creating group seating 155 among the subscribers as shown in FIG. 1AB. If the inquiry to decision step 359 is negative, then the "No" branch is followed to decision step 372 described below. If the inquiry to decision step 359 is positive, meaning option 208A or option 209A were selected, then the "Yes" branch is followed to step 361.

In step 361, the server 102A generates a list of subscriber friends and sends a message containing the subscriber friends to the PCD 105 running the TM-App 103.

Step 361 corresponds to both screen displays 107E and 107F of FIGS. 2E and 2F. For screen display 107E of FIG. 2E, in addition to the name of the subscriber being displayed, the current attending status for the friend subscriber is also displayed. If a subscriber friend is attending the live event, a link command 211 is displayed and can be selected. If a subscriber friend is not attending the live event, an invite command 213 is displayed and can be selected.

For screen display 107F of FIG. 2F, only the names of each subscriber friend are listed. Each name maybe selectable to issue either an invite or link command to a respective subscriber. As noted previously, a link command 211 is sent to subscriber friends already attending a live event means that the subscriber sending this command to a subscriber friend already attending desires to create a group seating arrangement 155 with the subscriber friend who is already attending the live event at venue 112.

An invite command 213 is sent to subscriber friends who are not currently attending a live event means that the subscriber sending this command to a subscriber friend not attending desires to create a group seating arrangement 155 with the subscriber friend who has not made a reservation yet with the system 101 for the live event at venue 112.

In step 363, the server 102A receives a selection of a subscriber friend for creating a group seating arrangement 155. Step 363 corresponds to the screen displays 107E and 107F in FIGS. 2E and 2F. Step 363 corresponds with screen display 107E and option 209B when either the link command 211 or invite command 213 are selected. Step 363 also corresponds with screen display 107F and option 208B when any one of the subscriber friend names 215 is selected.

Next, in step 365, the server 102A generates an invite or link command for the selected subscriber friend depending upon the existing status for the selected subscriber friend. In step 367, the server 102A transmits the invite or link command over the computer communications network 110 to the subscriber friend running a TM-App 103 on his/her PCD 105.

Subsequently, in decision step 369, the server 102A determines if an acceptance of an invite command 211 or link command 213 has been received over the communications network 110 from a subscriber friend. If the inquiry to decision step 369 is negative, then the "No" branch is followed to decision step 373.

If the inquiry to decision step 369 is positive, then the "Yes" branch is followed to step 371 in which a pass block for a group seating arrangement 155 among subscriber friends is created. In this step 371, the server 102A connects the reservations of two or more subscribers together. A pass block means that the server 102A is creating a link or block of passes that put the seats among the block together—one next to the other as illustrated in the group seating arrangement 155 of FIG. 1B.

Next, in decision block/step 373, the server 102A determines if an option 217 such as illustrated in screen display 107F has been selected to purchase one or more guest passes. Guest passes are for individuals who are not subscribers/members of the system 101 and do not have a TM-App 103 running on their PCD 105. If the inquiry to decision block 373 is negative, then the "No" branch is followed to step 381 of FIG. 3E.

Figure 3E:
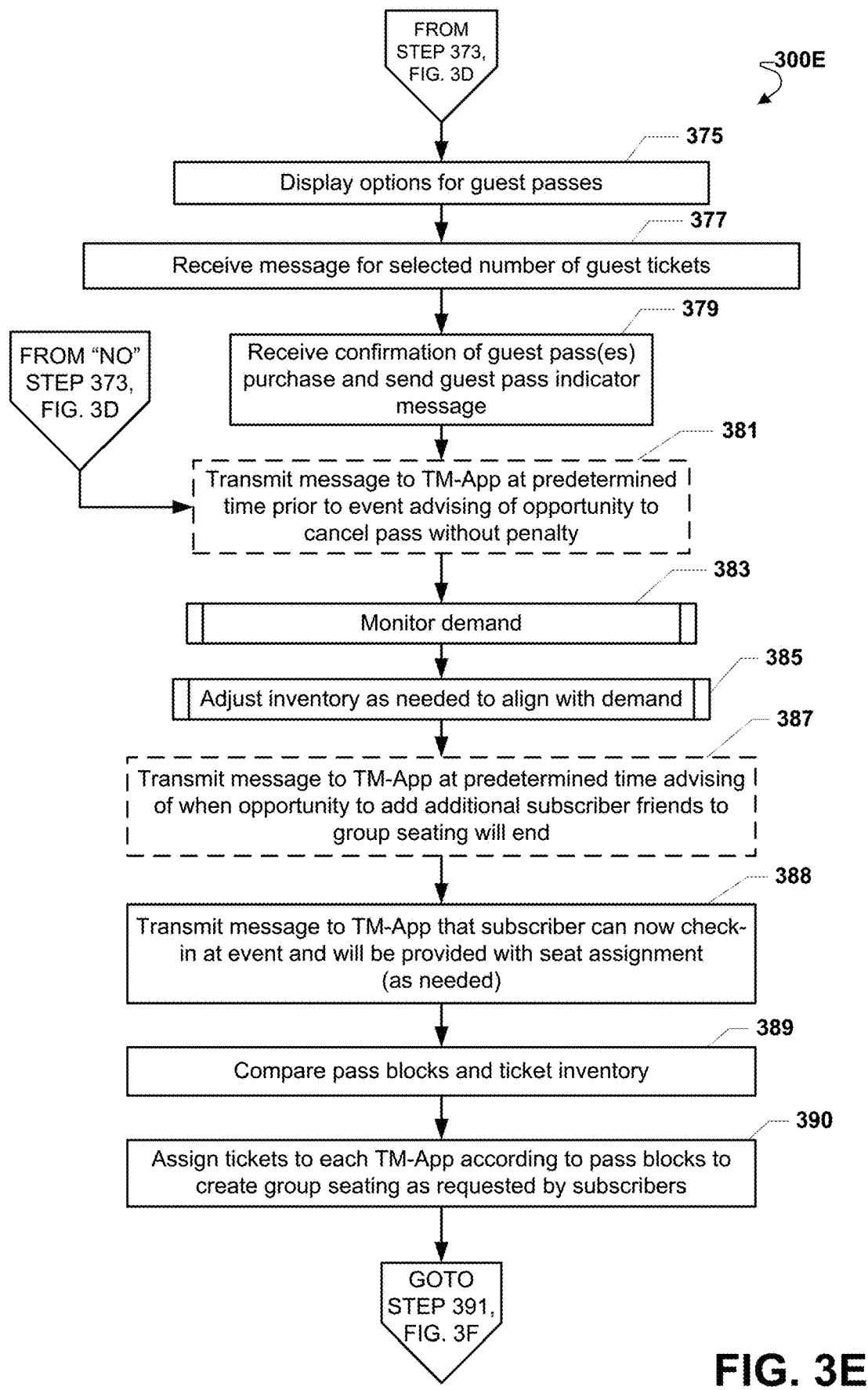
FIG. 3E illustrates a continuation-method/continuation of the flow chart relative to the method illustrated in FIG. 3D.

If the inquiry to decision step 373 is positive, then the "Yes" branch is followed to step 375 of FIG. 3E. The method 300D of FIG. 3D continues to block 375 of method 300E illustrated in FIG. 3E. Referring now to FIG. 3E, this figure illustrates a continuation-method 300E relative to the method 300E of FIG. 3D. In step 375, the server 102A may generate a message for display on the PCD 105 indicating the options for adding guest passes for the selected live event.

For example, see screen display 107G of FIG. 2G and guest pass option menu 230. Next, in step 377, the server 102A may receive the selected number of guest passes for the live event that will be charged to the subscriber's account on the day of the live event when check-in opens. In step 379, the server 102A may receive a confirmation of the guest pass(es) purchase and then send a guest pass indicator message. This step 379 corresponds with screen display 107H of FIG. 2H in which the subscriber is prompted to confirm the guest pass(es) purchase. If the subscriber confirms the purchase, then screen display 107I of FIG. 2I is displayed. Screen display 107I has a guest pass indicator 235 which indicates a number of guest passes that have been purchased by the subscriber.

In the exemplary embodiment of FIG. 2I, only one guest pass was purchased so the subscriber's name and/or symbol is displayed along with a parenthetical expression of "(+1)" for the guest pass indicator 235. Other graphical displays, besides the parenthetical expression, are possible for the guest pass indicator 235 and are included within the scope of this disclosure as understood by one of ordinary skill in the art.

Next in an optional step 381, the server 102A may transmit a message to each TM-App 103 at a predetermined time prior to the live event to advise when the opportunity to cancel the pass without any penalty may be made by the subscriber. This step 381 is optional and it may also be repeated at a few time prior to the live event to remind the subscriber of the system 101 that if he/she decides not to attend the live event, then the subscriber may cancel without a penalty up until a certain day and time.

In step 383, the server 102A may monitor the demand from its subscribers by comparing reservations made by TM-Apps 103 against the number of seats provided in the ticket inventory from the ticket data received from the event provider. In step 385, the server 102A may adjust its seat inventory as needed to align with its current demand being made by TM-Apps 103 of subscribers.

This means that if demand for tickets, such as a number of reservations made by TM-Apps 103 comes within a predetermined threshold of the seat/ticket inventory allocated from the ticket data, then the server 102A may send a request to the event provider to purchase additional inventory based on a new predetermined threshold calculated for the live event. Also, as group seating arrangements 155 by TM-Apps 103, the server 102A usually must continuously monitor its seating inventory to make sure the inventory may accommodate group seating arrangements 155 as requested. As group seating arrangements 155 increase, the server 102A may need to purchase additional ticket inventory where seats are adjacent to one another in order to accommodate any growing group seating arrangements 155.

While this adjusting of inventory can be performed manually, rules may be programmed to have the server 102A to automatically adjust inventory based on the rules and as understood by one of ordinary skill in the art. Further, the monitor demand step 383 and adjusting inventory step 385 may be continuously run in parallel by the server 102A relative to all steps described herein. That is, this monitoring of ticket/pass demand relative to reservations made by each TM-App 103 may be executed by the server 102A continuously while all other steps are executed in sequence.

Next, in optional step 387, the server 102A may transmit a message to each TM-App at predetermined time(s) advising of when the opportunity to add additional subscriber friends to a group seating arrangement 155 may end. This optional step 387 may be tied or connected to the monitoring of demand step 383 and the adjusting of inventory step 385 described above. The server 102A may determine that a group seating arrangement 155 has reached its maximum capacity relative to its current inventory. And if that situation occurs, the server 102A may not send out any message about adding subscriber friends to a group seating arrangement 155 since the present inventory may not permit an increase to the group seating arrangement 155 where group seats can be placed adjacent to each other.

Subsequently, in step 388, the server 102A may transmit a message at a predetermined time prior to the live event to each TM-App 103 that a subscriber can now check-in at the live event and indicate that seat assignment will be provided during check-in. Step 388 corresponds with screen display 107K of FIG. 2K in which the subscriber is advised that his or her ticket is ready. Screen display 107K may also present a listing of other friend subscribers who are scheduled to attend in accordance with the group seating arrangement 155.

As noted previously, certain live events may occur without venues 112, like outdoor festivals, and do not provide any seat assignments since there are no seats as such live events—only a maximum capacity of people permitted at the outdoor location. Thus, check-in for live events without venues 112 will not provide any seat assignment to the subscriber during the check-in process.

In step 389, the server 102A may compare pass blocks created by TM-Apps 103 for group seating arrangements 155 and the ticket inventory. Next, in step 390, the server 102A may assign tickets to each TM-App 103 according to the pass blocks comparison step 389 in order to create the group seating arrangements 155 as illustrated in FIG. 1. In this step 390, the actual seat locations (i.e. row number, section number, and seat number, etc.) are assigned to each TM-App 103 and in accordance with any group seating arrangements 155. During these two steps 389 and 390, the server 102A matches group seating arrangements 155 with the present inventory of seats. As noted previously, seats as well as pass blocks are not relevant for live events in which there are no seats because there is no venue 112 with seats.

Figure 3F:
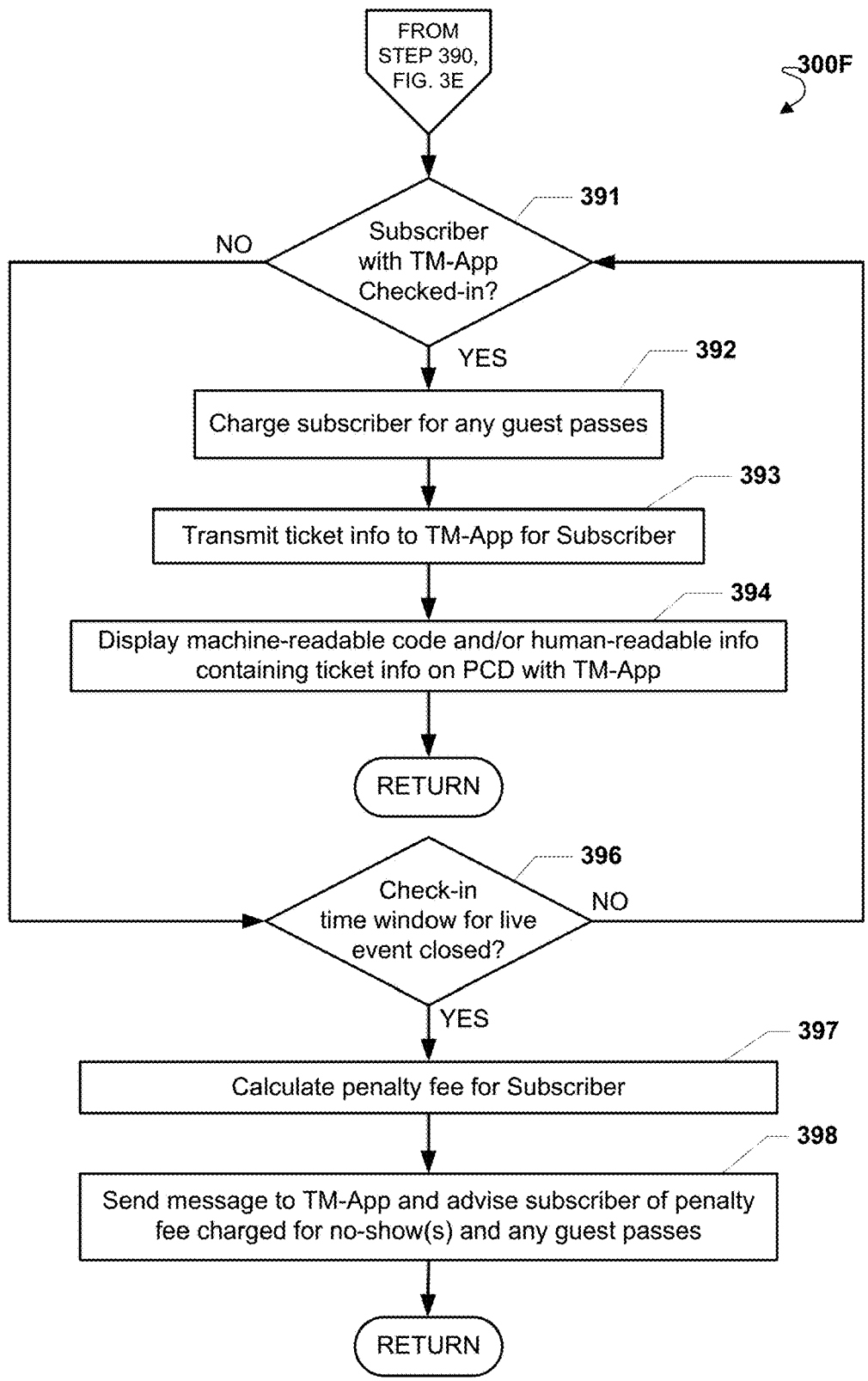
FIG. 3F illustrates a continuation-method/continuation of the flow chart relative to the method illustrated in FIG. 3E.

After block 390, the method 300E of FIG. 3E continues to decision block 391 of method 300F illustrated in FIG. 3F. Referring now to FIG. 3F, this figure illustrates a continuation-method 300F relative to the method 300E of FIG. 3E. In decision block/step 391, the server 102A working with the computing device 102C of the venue 112 determines if a subscriber with the TM-App 103 has checked-in at the venue 112. Further details about the checking-in process are described below in connection with FIG. 4.

If the inquiry to decision step 391 is positive, meaning that the subscriber with the TM-App 103 has checked-in at the venue 112, then the "Yes" branch is followed to step 392. If the inquiry to decision step 391 is negative, then the "No" branch is followed to decision step 396.

In step 392, the server 102A may then charge the subscriber's account any fees for guest passes which were purchased. In Step 393, the server 102A transmits the detailed ticket information over the communications network 110 to the PCD 105 running the TM-App 103. The ticket information may comprise machine-readable information as well as human readable information.

Next in step 394, the machine-readable and/or human readable information containing the ticket information is displayed on the PCD 105 running the TM-App 103. Step 394 corresponds with screen display 107L of FIG. 2L. In the exemplary embodiment of FIG. 2L, the detailed ticket information comprises machine-readable code that includes a two-dimensional bar code and human readable information comprising the section number [53], Row number [26], and seat number [9]. The detailed ticket information may also include a listing of the subscriber friends in the group seating arrangement 155. In the exemplary embodiment of FIG. 2L, the group seating arrangement 155 has the present subscriber and the subscriber friend named, "Ben." The method 300F then returns/repeats.

In decision step 396, which follows the "No" branch from decision step 391, the server 102A determines if the check-in time window for a reserved live event has closed. In this decision step 396, the server 102A is determining if the live event has expired and if the subscriber who made a reservation for the live event is a "no-show." If the inquiry to decision step 396 is negative, then the "No" branch is followed back to decision step 391 described above.

If the inquiry to decision step 396 is positive, meaning that the live event is over and/or the time period for allowing the subscriber to check-in at the live event has expired, then the "Yes" branch is followed to step 397.

In step 397, the server 102A may calculate any penalty fees for the no-show subscriber who did not check-in at the venue 112 for the live event with the TM-App 103 running on the PCD 105. Next, in step 399, the server 102A may send a message to the TM-App 103 to inform the subscriber of the penalty fee(s) charged to the subscriber account for the no-show(s) and any guest passes. The method 300F then returns/repeats.

Figure 4:
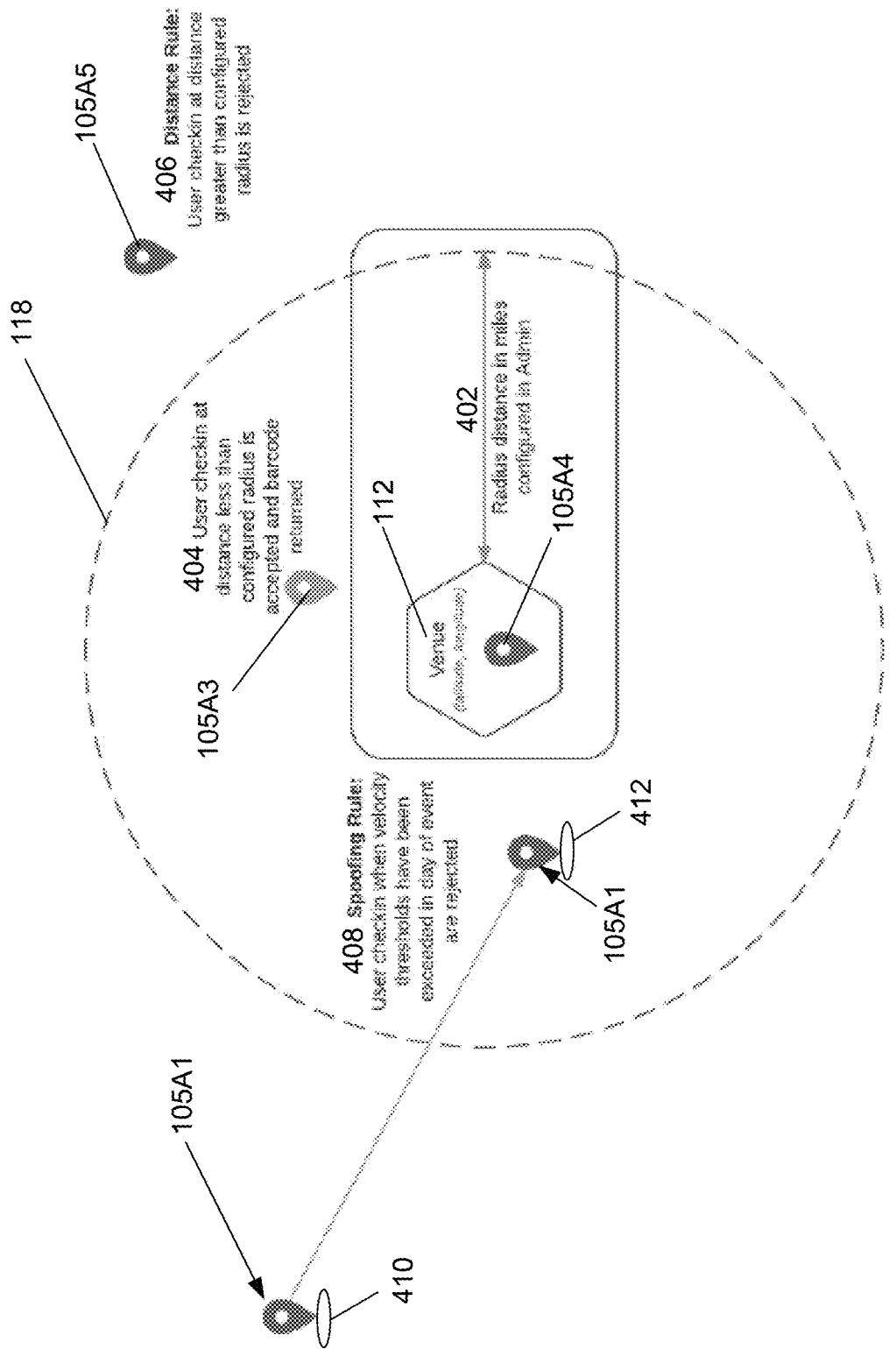
FIG. 4 illustrates some details about the geo-fence that is established around the venue to establish check-in for a subscriber and what geo-fence rules may be applicable depending upon the physical location of a subscriber's POD.

Referring now to FIG. 4, this figure illustrates some details about the geo-fence 118 that is established around the venue 112 to establish check-in for a subscriber and what geo-fence rules may be applicable depending upon the physical location of a subscriber's PCD 105. For each live event at a venue 112, latitude/longitude coordinates of the venue 112 are provided to the server 102A and a distance threshold 402 for check-in is established (default is usually about 2.0 miles from the center of the latitude/longitude coordinates of the venue 112). When the Ticket Assignment Window opens, each member PCD 105 with a reservation to the live event receives a push notification, such as illustrated in FIG. 2K, and can select the "Check-in" screen button on the Event Detail Page in the app 103.

When the member PCD 105 completes this action, their coordinates calculated by a GPS unit within the PCD 105 are passed to the server 102A from the TM-App 103 where a Haversine formula is used to calculate distance from the live event venue. If the PCD's 105 distance from the venue is within the acceptable radius, check-in is successful as designated by reference character 404. If the PCD's 105 distance from the venue is greater than the acceptable radius, check-in fails as designated by reference character 406. If the PCD's 105 velocity has tripped acceptable thresholds that day, the check-in is rejected as denoted by reference character 408.

The Haversine formula, listed below, allows calculating of the distance between two points on a sphere, given their latitude and longitude. The system 101 leverages the formula as a part of our geo-fencing mechanism. The sphere is the Earth so r=3,959 miles (the radius of the Earth).

HAVERSINE FORMULA:

$$hav\left(\frac{d}{r}\right) = hav(\varphi_2 - \varphi_1) + \cos(\varphi_1)\cos(\varphi_2)hav(\lambda_2 - \lambda_1)$$

When a member PCD 105 with a pass/reservation "checks-in" to a live event at a venue 112, their location in latitude and longitude is recorded and compared to the venue's location in latitude and longitude. φ1 and φ2 of the equation above are the latitude of the PCD 105 (point 1) and latitude of the venue (point 2), in radians. λ1 and λ2 are the longitude of the member PCD 105 (point 1) and longitude of the venue (point 2), in radians. With these inputs, the system can solve for 'd' which is done for locations 404 and 406 of FIG. 4. If the distance 'd' is greater than the acceptable distance, the check-in attempt fails and a message then can be displayed on the PCD 105 telling the subscriber that he/she is not close enough to the venue to check-in. If 'd' is less than the acceptable distance, then the check-in attempt succeeds and the member PCD 105 receives a barcode and seat location.

Referring reference character 408 of FIG. 4, designated as application of a spoofing rule, the latitude and longitude of a member PCD 105A1 is recorded when they take an action within the app 103. If their velocity (distance/time) is higher than an acceptable threshold, their check-in attempt may also be rejected. This would occur if the subscriber was attempting to check-in by "driving-by" the venue 112 in a vehicle, like a car, in order to circumvent any penalties for a no-show to a live event. The subscriber PCD 105A1 would attempt to check-in while in the vehicle, but not actually enter the venue 112.

The Haversine formula would be used to calculate the distance between the member PCD 105A1 location 410 and the member PCD 105A1 location 412, divided by the time between the actions, and compared to an acceptable threshold. The acceptable threshold is configurable, but a good frame a reference could be the speed of a car (approximately 30 mph).

Figure 5:
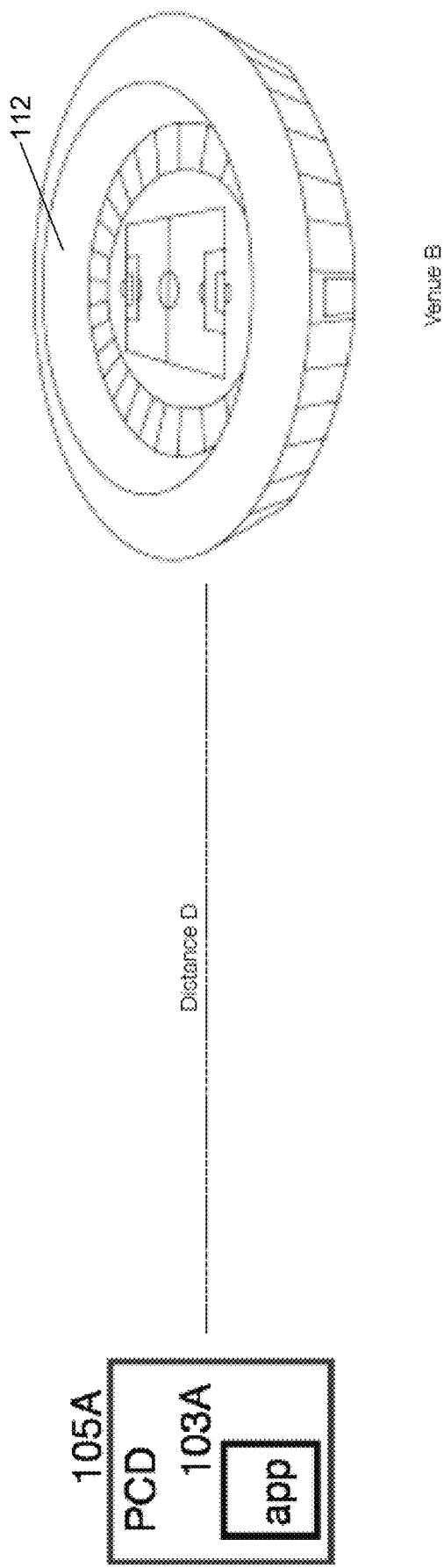
FIG. 5 illustrates a Distance Rule employed during the geo-fence portion of the check-in process for a subscriber with a PCD running the TM-App.

FIG. 5 illustrates a Distance Rule employed during the geo-fence portion of the check-in process for a subscriber with a PCD 105 running the TM-App 103. When a live event provider 102B/105C of FIG. 1 is setup in Admin module 104 (FIG. 1) by a system operator, their venue's location (latitude, longitude) and the maximum allowable distance for check-in is inputted. The venue's location may be found by viewing the venue on a map, like GOOGLE-MAPS™. The default maximum allowable distance is usually set to be about 2.0 miles, but the system 101 may input a larger value for venue's in remote locations.

If PCD 105A of FIG. 5 attempts to check-in to an event in at Venue 112, the API module 106 of server 102A may validate their entry into the geo-fence 118. As a part of this validation, the API module 106 may leverage code modeled after the Haversine formula to calculate the distance between PCD 105 and Venue B (Distance D). If Distance D exceeds the maximum allowable distance for check-in, the member PCD 105 check-in attempt may be rejected by the server 102A. If Distance D is less than the maximum allowable distance for check-in, the member PCD 105 check-in attempt would succeed. This same analysis was also performed for locations 404 and 406 of FIG. 4.

Figure 6:
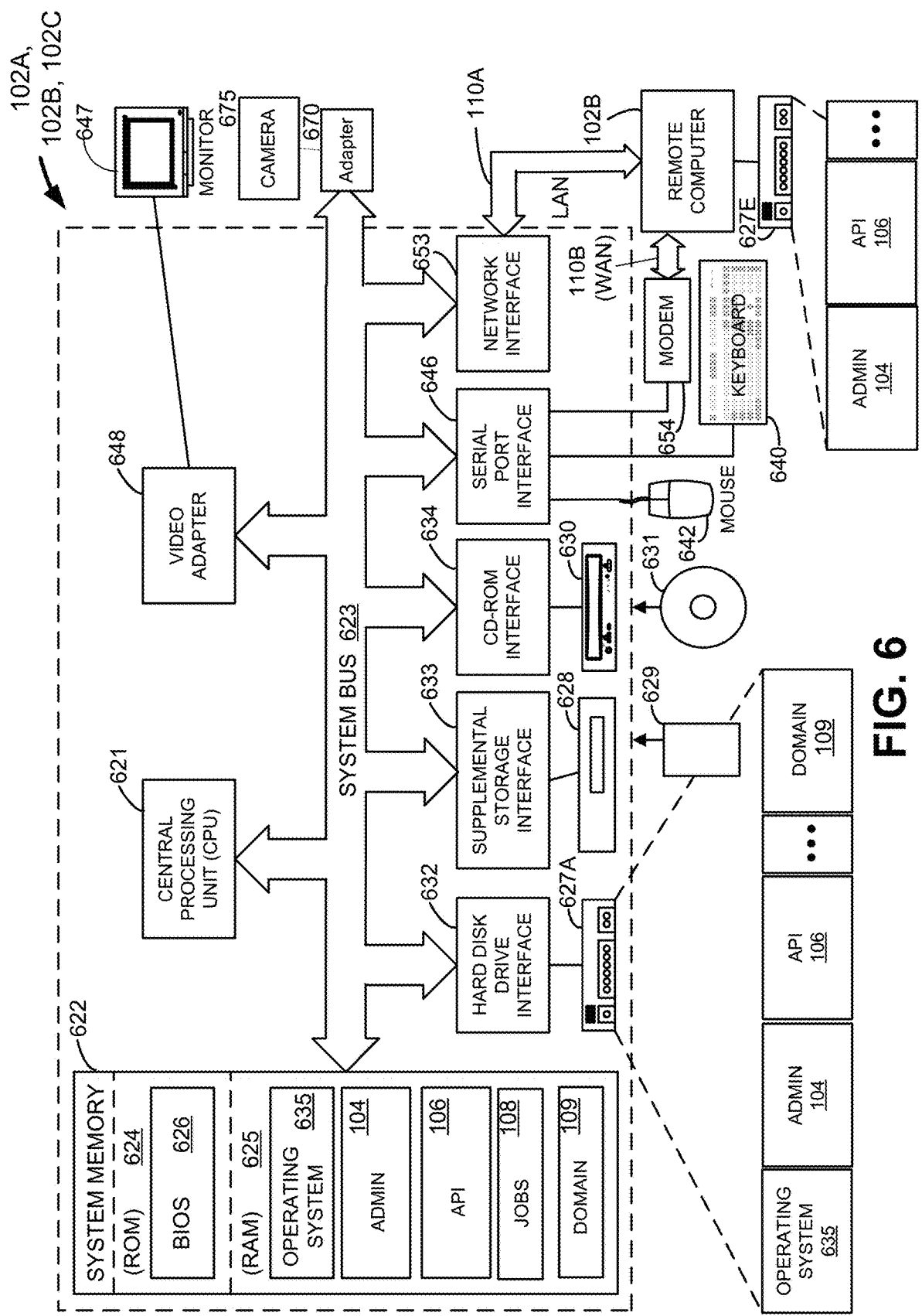
FIG. 6 is a functional block diagram of an internet connected computer as illustrated in FIG. 1A and that can be used in the system for providing on-demand electronic seating for live events with portable computing devices according to an exemplary embodiment of the invention.

Referring now to FIG. 6, this figure is a functional block diagram of an internet connected, for example, a computer 102A/102B/102C as illustrated in FIG. 1A and that can be used in the system 101 for providing on-demand electronic seating for live events with portable computing devices 105 according to an exemplary embodiment of the invention. The exemplary operating environment for the system 101 includes a general-purpose computing device in the form of a conventional computer 102A/102B/102C.

Generally, a 102A/102B/102C includes a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes a read-only memory (ROM) 624 and a random access memory (RAM) 625. A basic input/output system (BIOS) 626, containing the basic routines that help to transfer information between elements within computer 102, such as during start-up, is stored in ROM 624.

The computer 102A/102B/102C can include a hard disk drive 627A for reading from and writing to a hard disk, not shown, a supplemental storage drive for reading from or writing to a removable supplemental storage 629 (like flash memory and/or a USB drive) and an optical disk drive 630 for reading from or writing to a removable optical disk 631 such as a CD-ROM or other optical media. Hard disk drive 627A, supplemental storage drive 628, and optical disk drive 630 are connected to system bus 623 by a hard disk drive interface 632, a supplemental storage drive interface 633, and an optical disk drive interface 634, respectively.

Although the exemplary environment described herein employs hard disk 627A, removable supplemental storage 629, and removable optical disk 631, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet connected devices such as in cellular phones 105 and/or personal digital assistants (PDAs) 105.

The drives and their associated computer readable media illustrated in FIG. 6 provide nonvolatile storage of computer-executable instructions, data structures, program modules, and other data for computer or client device 102A/102B/102C. A number of program modules may be stored on hard disk 627, supplemental storage 629, optical disk 631, ROM 624, or RAM 625, including, but not limited to, the Admin module 104; the API module 106; and the Jobs module 108.

Program modules may include, but are not limited to, routines, sub-routines, programs, objects, components, data structures, etc., which perform particular tasks or implement particular abstract data types. Aspects of the present invention may be implemented in the form of a downloadable, client-side, application 103 [SEE FIG. 1] which may have parts/functions executed by the 102A/102B in order to adjust electronic seating for a live event.

A system operator may enter commands and information into computer 102A/102B through input devices, such as a keyboard 640 and a pointing device 642. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 621 through a serial port interface 646 that is coupled to the system bus 623, but may be connected by other interfaces, such as a parallel port, game port, a universal serial bus (USB), or the like.

The display 647 may also be connected to system bus 623 via an interface, such as a video adapter 648. As noted above, the display 647 can comprise any type of display devices such as a liquid crystal display (LCD), a plasma display, an organic light-emitting diode (OLED) display, and a cathode ray tube (CRT) display.

The camera 675 may also be connected to system bus 623 via an interface, such as an adapter 670. As noted previously, the camera 675 can comprise a video camera such as a webcam. The camera 675 can be a CCD (charge-coupled device) camera or a CMOS (complementary metal-oxide-semiconductor) camera. In addition to the monitor 647 and camera 675, the client device 102B, comprising a computer, may include other peripheral output devices (not shown), such as speakers and printers.

The computers 102A/102B/102C may operate in a networked environment using logical connections to one or more remote computers, such as the live event provider computing device 102B. A remote computer 102B may be another personal computer, a server, a mobile phone 105C, a router, a network PC, a peer device, or other common network node. While the remote computer 102B typically includes many or all of the elements described above relative to the server 102A, only a memory storage device 627E has been illustrated in FIG. 6. The logical connections depicted in FIG. 6 include a local area network (LAN) 110A and a wide area network (WAN) 110B. Such networking environments are commonplace in offices, enterprise-wide computer networks, intranets, and the Internet.

When used in a LAN networking environment, the computers 102A/102B/102C are often connected to the local area network 110A through a network interface or adapter 653. When used in a WAN networking environment, the computers 102A/102B/102C typically includes a modem 654 or other means for establishing communications over WAN 110B, such as the Internet. Modem 654, which may be internal or external, is connected to system bus 623 via serial port interface 646. In a networked environment, program modules depicted relative to the server 102A, or portions thereof, may be stored in the remote memory storage device 627E of remote computer 102B. It will be appreciated that the network connections shown are exemplary and other means of establishing a communications link between the computers 102 and mobile phones 105 of FIG. 1A may be used.

Figure 7:
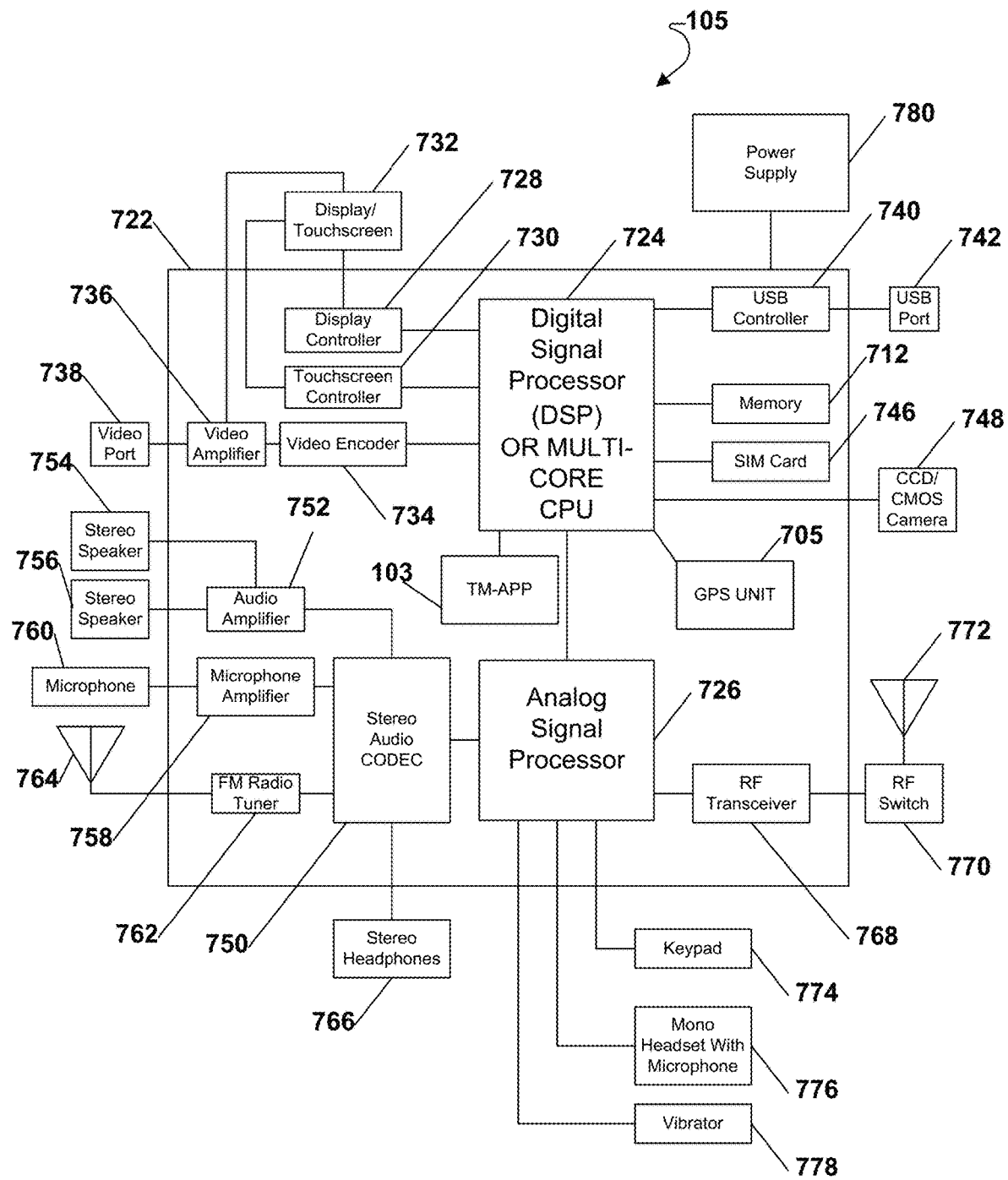
FIG. 7 is a diagram of an exemplary, non-limiting aspect of an internet connected device comprising a wireless mobile telephone which corresponds the PCDs of FIG. 1A.

Referring to FIG. 7, this figure is a diagram of an exemplary, non-limiting aspect of an internet connected device comprising a wireless mobile telephone 105 which corresponds with PCDs of FIG. 1A. As shown, the mobile telephone 105 includes an on-chip system 722 that includes a digital signal processor or a central processing unit 724 and an analog signal processor 726 that are coupled together. As illustrated in FIG. 7, a display controller 728 and a touchscreen controller 730 are coupled to the digital signal processor 724. A touchscreen display 732 external to the on-chip system 722 is coupled to the display controller 728 and the touchscreen controller 730.

FIG. 7 further illustrates a video encoder 734, e.g., a phase-alternating line ("PAL") encoder, a sequential couleur avec memoire ("SECAM") encoder, a national television system(s) committee ("NTSC") encoder or any other video encoder, is coupled to the digital signal processor 724. Further, a video amplifier 736 is coupled to the video encoder 734 and the touchscreen display 732. A video port 738 is coupled to the video amplifier 736. As depicted in FIG. 7, a universal serial bus ("USB") controller 740 is coupled to the digital signal processor 724. Also, a USB port 742 is coupled to the USB controller 740. A memory 712 and a subscriber identity module ("SIM") card 746 may also be coupled to the digital signal processor 724.

Further, as shown in FIG. 7, a digital camera 748 may be coupled to the digital signal processor 724. In an exemplary aspect, the digital camera 748 is a charge-coupled device ("CCD") camera or a complementary metal-oxide semiconductor ("CMOS") camera.

As further illustrated in FIG. 7, a stereo audio CODEC 750 may be coupled to the analog signal processor 726. Moreover, an audio amplifier 752 may be coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation ("FM") radio tuner 762 may be coupled to the stereo audio CODEC 750. Also, an FM antenna 764 is coupled to the FM radio tuner 762. Further, stereo headphones 766 may be coupled to the stereo audio CODEC 750.

FIG. 7 further illustrates a radio frequency ("RF") transceiver 768 that may be coupled to the analog signal processor 726. An RF switch 770 may be coupled to the RF transceiver 768 and an RF antenna 772. The RF transceiver 768 may communicate with conventional communications networks as well as with global positioning system ("GPS") satellites in order to obtain GPS signals for geographical coordinates. These GPS signals are helpful in tracking the geo-fence 118 noted above in connection with FIG. 1A.

As shown in FIG. 7, a keypad 774 may be coupled to the analog signal processor 726. Also, a mono headset with a microphone 776 may be coupled to the analog signal processor 726. Further, a vibrator device 778 may be coupled to the analog signal processor 726. FIG. 7 also shows that a power supply 780 may be coupled to the on-chip system 722. In a particular aspect, the power supply 780 is a direct current ("DC") power supply that provides power to the various components of the mobile telephone 105 that require power. Further, in a particular aspect, the power supply is a rechargeable DC battery or a DC power supply that is derived from an alternating current ("AC") to DC transformer that is connected to an AC power source.

FIG. 7 also shows that the mobile telephone 105 may include a client application program, referenced as the TM-App 103 noted above The client application program 103 may comprise hardware and/or software. The client application program 103 may communicate with the server 102A (FIG. 1) for updating electronic seating records. While only a few mobile telephones 105 and computers 102 (FIG. 1) have been illustrated with having the client side application 103 in FIG. 1, it is understood by one of ordinary skill in the art that each of these devices 102/105 may have a copy of the client-side application program for managing electronic seating at a live event. The CPU 724 may be coupled to a Global Positioning System (GPS) unit 705. The GPS unit 705 may comprise software and/or hardware and/or firmware as understood by one of ordinary skill in the art. The GPS unit 705 may provide geo-coordinates of the location of the PCD 105 to the TM-App 103 which uses the geo-coordinates for the check-in feature described above.

As depicted in FIG. 7, the touchscreen display 732, the video port 738, the USB port 742, the camera 748, the first stereo speaker 754, the second stereo speaker 756, the microphone 760, the FM antenna 764, the stereo headphones 766, the RF switch 770, the RF antenna 772, the keypad 774, the mono headset 776, the vibrator 778, and the power supply 780 are external to the on-chip system 722.

In a particular aspect, one or more of the method steps described herein (such as illustrated in FIG. 2) may be stored in the memory 712 of the mobile phone 105 of FIG. 7 and memory 622 of the computing device 102 of FIG. 6 as computer program instructions. These computer program instructions may be executed by the digital signal processor or central processing unit 724, the analog signal processor 726, or another processor, to perform the methods described herein. Further, the processors, 724, 726, the memory 622, the instructions stored therein, or a combination thereof may serve as a means for performing one or more of the method steps described herein.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Further, certain steps in the processes or process flows (such as in FIG. 3) described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention.

Similarly, in the claims, means-plus-function clauses are intended to cover the structures described herein as performing the recited function and not only structural equivalents, but also equivalent structures. Thus, although RAM and ROM may not be structural equivalents in that Random Access Memory (RAM) is volatile when power is lost, whereas Read Only Memory (ROM) is non-volatile when power is lost, in the environment of computer memory, RAM and ROM may be equivalent structures. It is the express intention of the applicant not to invoke 35 U.S.C. § 112, sixth paragraph for any limitations of any of the claims herein, except for those in which the claim expressly uses the words 'means for' together with an associated function.

What is claimed is:

1. A method of distributing electronic ticket status information over a network to a first remote subscriber portable computing device for a live event within a venue, the method comprising:

providing an electronic ticket manager application to a subscriber for installation on the first remote subscriber portable computing device;

receiving ticket data with a transmission server for the live event over the Internet, the transmission the transmission server comprising a microprocessor and a memory that stores the remote subscriber's preferences for ticket information format and destination address;

wherein the microprocessor of the transmission server filters the ticket data based on past live events and other subscribers who have attended past live events with the subscriber in a group seating arrangement in which the subscriber and other subscribers had assigned seating with seats adjacent to each other;

wherein the microprocessor of the transmission server further:

receives a request over the internet for details about a live event;

generates an electronic reservation alert from the filtered data indicating other subscribers who have attended past live events with the subscriber and providing details about the live event;

formats the electronic reservation alert for display on the first remote subscriber portable computing device;

transmits the formatted electronic reservation alert over a wireless communication channel to the first remote subscriber portable computing device based upon the destination address, wherein the alert activates the first remote subscriber portable computing device to display a first group seating message that lists one or more other subscribers who are attending the live event and who the subscriber may invite to sit with the subscriber at the live event, receives a request from the first remote subscriber portable computing device to attend the live event;

sends a second group seating message to the first remote subscriber portable computing device that lists one or more other subscribers who are also attending the live event and that are selectable within the message to create group seating by the first remote subscriber portable computing device;

receives a group seating request for the live event from the first remote subscriber portable computing device, the group seating request comprising one of the other subscribers selected from the second group seating message;

transmits the group seating request to a second remote subscriber portable computing device of the selected subscriber from second group seating message;

receives an electronic acceptance of the group seating request from the second remote subscriber computing device;

transmits a check-in message on a day of the live event to the first remote subscriber portable computing device, the check-in message comprising an on-screen check-in button and listing the subscriber of the first remote subscriber portable computing device and the selected subscriber from the second group seating message;

the microprocessor of the transmission server automatically monitoring an electronic geo-fence created around the venue to detect a presence of the first remote subscriber portable computing device when the check-in button on the first remote subscriber portable computing device is selected, the geo-fence being generated based on a first set of latitude and longitude coordinates of the venue in addition to a predetermined radius relative to the latitude and longitude coordinates of the venue;

the microprocessor of the transmission server receiving a second set of latitude and longitude coordinates from the first remote subscriber portable computing device when the check-in button on the first remote subscriber portable computing device is selected;

the microprocessor of the transmission server using the second set of latitude and longitude coordinates in a formula to automatically determine if the first remote subscriber portable computing device is within the predetermined radius relative to the latitude and longitude coordinates of the venue; and the microprocessor of the transmission server sending an electronic ticket for the live event containing seat location data to the first remote subscriber portable computing device if the microprocessor determines that the first remote subscriber portable computing device is within the predetermined radius.

2. The method of claim 1, wherein the formatted electronic reservation alert does not contain any location of seats within the venue.

3. The method of claim 1, wherein the first and second remote subscriber portable computing devices each comprises at least one of a cellular telephone, a satellite telephone, a pager, a portable digital assistant (PDA), a smartphone, a navigation device, a smartbook, a media player, and a tablet computer.

4. The method of claim 1, wherein the live event comprises at least one of a music concert, a musical, a movie, a comedy show, a sporting event, and a festival.

5. A system for distributing electronic ticket status information over a network to a first remote subscriber portable computing device for a live event within a venue, the system comprising:

the first remote subscriber portable computing device that executes an electronic ticket manager application, the remote subscriber portable computing device comprising a portable computing device which is hand-held;

a transmission server for receiving ticket data for the live event over the Internet, the transmission server comprising a microprocessor and a memory that stores the remote subscriber's preferences for ticket information format and destination address;

wherein the microprocessor filters the ticket data based on past live events and other subscribers who have attended past live events with the subscriber in a group seating arrangement in which the subscriber and other subscribers had assigned seating with seats adjacent to each other;

receives a request over the internet for details about a live event;

generates an electronic reservation alert from the filtered data indicating other subscribers who have attended past live events with the subscriber and providing details about the live event;

formats the electronic reservation alert for display on the first remote subscriber portable computing device;

transmits the formatted electronic reservation alert over a wireless communication channel to the first remote subscriber portable computing device based upon the destination address and, wherein the alert activates the first remote subscriber portable computing device to display a first group seating message that lists one or more other subscribers who are attending the live event and who the subscriber may invite to sit with the subscriber at the event;

receives a request from the first remote subscriber portable computing device to attend the live event;

sends a second group seating message to the first remote subscriber portable computing device that lists one or more other subscribers who are also attending the live event and that are selectable within the message to create group seating by the first remote subscriber portable computing device;

receives a group seating request for the live event from the first remote subscriber portable computing device, the group seating request comprising one of the other subscribers selected from the second group seating message;

transmits the group seating request to a second remote subscriber portable computing device of the selected subscriber from second group seating message;

receives an electronic acceptance of the group seating request from the second remote subscriber computing device;

transmits a check-in message on a day of the live event to the first remote subscriber portable computing device, the check-in message comprising an on-screen check-in button and listing the subscriber of the first remote subscriber portable computing device and the selected subscriber from the second group seating message;

automatically monitoring an electronic geo-fence created around the venue to detect a presence of the first remote subscriber portable computing device when the check-in button on the first remote subscriber portable computing device is selected, the geo-fence being generated based on a first set of latitude and longitude coordinates of the venue in addition to a predetermined radius relative to the latitude and longitude coordinates of the venue;

receiving a second set of latitude and longitude coordinates from the first remote subscriber portable computing device when the check-in button on the first remote subscriber portable computing device is selected;

using the second set of latitude and longitude coordinates in a formula to automatically determine if the first remote subscriber portable computing device is within the predetermined radius relative to the latitude and longitude coordinates of the venue; and sending an electronic ticket for the live event containing seat location data to the first remote subscriber portable computing device if the microprocessor determines that the first remote subscriber portable computing device is within the predetermined radius.

6. The system of claim 5, wherein the formatted electronic reservation alert does not contain any location of seats within the venue.

7. The system of claim 5, wherein the first and second remote subscriber portable computing devices each comprise at least one of a cellular telephone, a satellite telephone, a pager, a portable digital assistant (PDA), a smartphone, a navigation device, a smartbook, a media player, and a tablet computer.

8. The system of claim 5, wherein the live event comprises at least one of a music concert, a musical, a movie, a comedy show, a sporting event, and a festival.

* * * * *